United States Patent
Kim

(10) Patent No.: US 11,231,623 B2
(45) Date of Patent: Jan. 25, 2022

(54) DISPLAY DEVICE

(71) Applicant: Samsung Display Co., Ltd., Yongin-si (KR)

(72) Inventor: Seulki Kim, Incheon (KR)

(73) Assignee: Samsung Display Co., Ltd., Yongin-si (KR)

( * ) Notice: Subject to any disclaimer, the term of this patent is extended or adjusted under 35 U.S.C. 154(b) by 243 days.

(21) Appl. No.: 15/823,487

(22) Filed: Nov. 27, 2017

(65) Prior Publication Data

US 2018/0164620 A1 Jun. 14, 2018

(30) Foreign Application Priority Data

Dec. 8, 2016 (KR) .................. 10-2016-0166725

(51) Int. Cl.
   *G02F 1/1345* (2006.01)
   *G02F 1/1343* (2006.01)
   *G02F 1/1362* (2006.01)

(52) U.S. Cl.
   CPC .......... *G02F 1/1343* (2013.01); *G02F 1/1345* (2013.01); *G02F 1/134309* (2013.01);
   (Continued)

(58) Field of Classification Search
   None
   See application file for complete search history.

(56) References Cited

U.S. PATENT DOCUMENTS

| 9,568,761 | B2 | 2/2017 | Wu |
| 10,067,620 | B2 | 9/2018 | Xie et al. |

(Continued)

FOREIGN PATENT DOCUMENTS

| CN | 103941494 | 7/2014 |
| CN | 104777653 | 7/2015 |

(Continued)

OTHER PUBLICATIONS

Extended European Search Report dated May 2, 2018, in European Patent Application No. 17206264.8.

*Primary Examiner* — Lauren Nguyen
*Assistant Examiner* — Anthony G Quash
(74) *Attorney, Agent, or Firm* — H.C. Park & Associates, PLC

(57) ABSTRACT

A display device is capable of improving image quality, the display device including: a first substrate and a second substrate facing each other; a common electrode between the first substrate and the second substrate, the common electrode including a first area and a second area; a first pixel group including a plurality of first pixel electrodes located at a display area of the first substrate and overlapping the first area of the common electrode; a second pixel group including a plurality of second pixel electrodes located at the display area of the first substrate and overlapping the second area of the common electrode; a first auxiliary line physically connected to the first area of the common electrode; a second auxiliary line physically connected to the second area of the common electrode; a first connection portion located at a non-display area of the first substrate and electrically connected to the first auxiliary line; and a second connection portion located at the non-display area of the first substrate and electrically connected to the second auxiliary line. The first connection portion and the second connection portion do not physically contact each other.

27 Claims, 10 Drawing Sheets

(52) U.S. Cl.
CPC .... *G02F 1/136286* (2013.01); *G02F 1/13629* (2021.01); *G02F 1/134372* (2021.01); *G02F 2201/121* (2013.01)

(56) References Cited

U.S. PATENT DOCUMENTS

| | | | |
|---|---|---|---|
| 2002/0163611 A1* | 11/2002 | Kamijima | G02F 1/1339 349/122 |
| 2007/0002005 A1 | 1/2007 | Kim et al. | |
| 2013/0077008 A1 | 3/2013 | Kim et al. | |
| 2013/0293791 A1* | 11/2013 | Abe | G06F 3/0418 349/12 |
| 2014/0176885 A1* | 6/2014 | Okita | G02F 1/133512 349/106 |
| 2014/0198277 A1* | 7/2014 | Yu | G02F 1/136286 349/43 |
| 2015/0062471 A1 | 3/2015 | Sung et al. | |
| 2016/0018708 A1* | 1/2016 | Kanda | G02F 1/136209 257/254 |
| 2016/0070130 A1* | 3/2016 | Yuminami | G02F 1/13452 349/110 |
| 2016/0282690 A1 | 9/2016 | Hong et al. | |
| 2016/0327834 A1 | 11/2016 | Yu et al. | |
| 2019/0294285 A1* | 9/2019 | Abe | G02F 1/13338 |

FOREIGN PATENT DOCUMENTS

| | | |
|---|---|---|
| CN | 105677086 | 6/2016 |
| KR | 10-2011-0072886 | 6/2011 |
| KR | 10-2013-0032743 | 4/2013 |
| KR | 10-2016-0116187 | 10/2016 |

\* cited by examiner

DISPLAY DEVICE

CROSS-REFERENCE TO RELATED APPLICATION

This application claims priority from and the benefit of Korean Patent Application No. 10-2016-0166725, filed on Dec. 8, 2016, which is hereby incorporated by reference for all purposes as if fully set forth herein.

BACKGROUND

Field

Exemplary embodiments relate to a display device capable of improving image quality.

Discussion of the Background

Liquid crystal displays (LCDs) are one of the most widely used flat panel display (FPD) devices.

The liquid crystal display device is a display device that adjusts the amount of transmitted light by applying voltage to two electrodes and rearranging liquid crystal molecules in a liquid crystal layer.

The above information disclosed in this Background section is only for enhancement of understanding of the background of the inventive concepts, and, therefore, it may contain information that does not form the prior art that is already known in this country to a person of ordinary skill in the art.

SUMMARY

Exemplary embodiments provide a display device having improved image quality.

Additional aspects will be set forth in the detailed description which follows, and, in part, will be apparent from the disclosure, or may be learned by practice of the inventive concepts.

According to one or more exemplary embodiments, a display device includes: a first substrate and a second substrate facing each other; a common electrode between the first substrate and the second substrate, the common electrode including a first area and a second area; a first pixel group including a plurality of first pixel electrodes located at a display area of the first substrate and overlapping the first area of the common electrode; a second pixel group including a plurality of second pixel electrodes located at the display area of the first substrate and overlapping the second area of the common electrode; a first auxiliary line physically connected to the first area of the common electrode; a second auxiliary line physically connected to the second area of the common electrode; a first connection portion located at a non-display area of the first substrate and electrically connected to the first auxiliary line; and a second connection portion located at the non-display area of the first substrate and electrically connected to the second auxiliary line. The first connection portion and the second connection portion do not physically contact each other.

The display device may further include a first common line connected to the first connection portion; and a second common line connected to the second connection portion.

The display device may further include a first connection electrode connecting the first connection portion and the first common line to each other; and a second connection electrode connecting the second connection portion and the second common line to each other.

The display device may further include at least one data line located at the first substrate; and a data driver driving said at least one data line. The first connection electrode may be located farther away from the data driver than the second connection electrode is from the data driver, and a size of the first connection electrode may be larger than a size of the second connection electrode.

The display device may further include at least one data line located at the first substrate; and a data driver driving said at least one data line. A first overlap portion between the first connection electrode and the first connection portion may be located farther away from the data driver than a second overlap portion between the second connection electrode and the second connection portion is from the data driver. A size of the first overlap portion may be larger than a size of the second overlap portion.

The display device may further include a power supply unit applying a first common voltage to the first common line and applying a second common voltage to the second common line.

The second common voltage may be substantially equal to or higher than the first common voltage.

At least one of the first connection electrode and the second connection electrode may include a material substantially the same as a material included in the pixel electrode.

The display device may further include at least one gate line located at the first substrate. The first auxiliary line may overlap a gate line located at the first area.

The display device may further include at least one gate line located at the first substrate. The second auxiliary line may overlap a gate line located at the second area.

The first auxiliary line may include a plurality of first auxiliary lines and the second auxiliary line may include a plurality of second auxiliary lines. A distance between a first auxiliary line and a second auxiliary line that are adjacent to each other may be greater than a distance between adjacent ones of the first auxiliary lines.

The first auxiliary line may include a plurality of first auxiliary lines and the second auxiliary line may include a plurality of second auxiliary lines. A distance between adjacent ones of the first auxiliary lines may be substantially equal to a distance between adjacent ones of the second auxiliary lines.

The first auxiliary line may include a plurality of first auxiliary lines and the second auxiliary line may include a plurality of second auxiliary lines. A distance between adjacent ones of the first auxiliary lines may be different from a distance between adjacent ones of the second auxiliary lines.

The display device may further include at least one data line located at the first substrate; and a data driver driving said at least one data line. The first auxiliary line may include a plurality of first auxiliary lines and the second auxiliary line may include a plurality of second auxiliary lines, the first auxiliary line may be located farther away from the data driver than the second auxiliary line is from the data driver, and a distance between adjacent ones of the first auxiliary lines may be less than a distance between adjacent ones of the second auxiliary lines.

The number of first auxiliary lines may be different from the number of second auxiliary lines.

The display device may further include at least one data line located at the first substrate; and a data driver driving said at least one data line. The first auxiliary line may be located farther away from the data driver than the second auxiliary line is from the data driver, and the number of first auxiliary lines may be larger than the number of second auxiliary lines.

A width of the first auxiliary line may be different from a width of the second auxiliary line.

The display device may further include at least one data line located at the first substrate; and a data driver driving said at least one data line. The first auxiliary line may be located farther away from the data driver than the second auxiliary line is from the data driver, and the width of the first auxiliary line may be greater than the width of the second auxiliary line.

The display device may further include at least one first connection line connecting adjacent ones of the first auxiliary lines.

The display device may further include at least one data line located at the first substrate. Said at least one first connection line may overlap at least one data line located at the first area.

The display device may further include at least one second connection line connecting adjacent ones of the second auxiliary lines.

The display device may further include at least one data line located at the first substrate. Said at least one second connection line may overlap at least one data line located at the second area.

The common electrode may further include at least one of third to n-th areas, wherein n is a natural number greater than 3.

The display device may further include at least one third auxiliary line to at least one n-th auxiliary line connected in one-to-one correspondence to said third to n-th areas.

The display device may further include third to n-th connection portions electrically connected in one-to-one correspondence to said at least one third auxiliary line to said at least one n-th auxiliary line. The first to n-th connection portions may not be physically connected to each other.

The common electrode may include a first common electrode and a second common electrode which are separated from each other, the first common electrode may be located at the first area and the second common electrode may be located at the second area, the first auxiliary line may be connected to the first common electrode, and the second auxiliary line may be connected to the second common electrode.

The display device may further include at least one of third to n-th common electrodes which are separated from each other, wherein n is a natural number greater than 3.

The display device may further include at least one third auxiliary line to at least one n-th auxiliary line connected in one-to-one correspondence to said third to n-th common electrodes.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
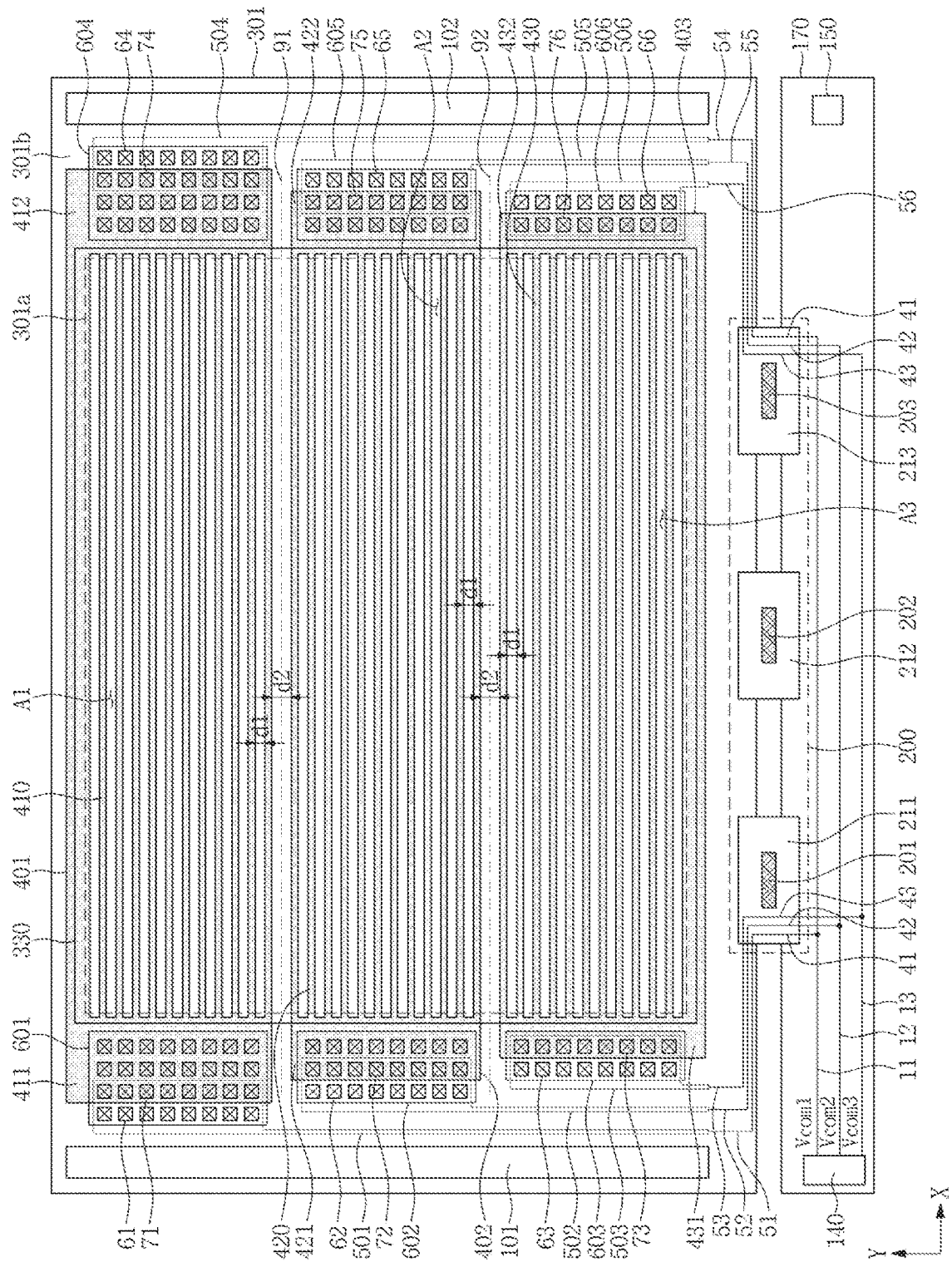
FIG. 1 is a view illustrating a display device according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. As such, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Some of the parts which are not associated with the description may not be provided in order to specifically describe exemplary embodiments according to an exemplary embodiment and like reference numerals refer to like elements throughout the specification.

Hereinafter, the display device according to exemplary embodiments will be described in detail with reference to FIGS. 1 to 11.

Figure 2:
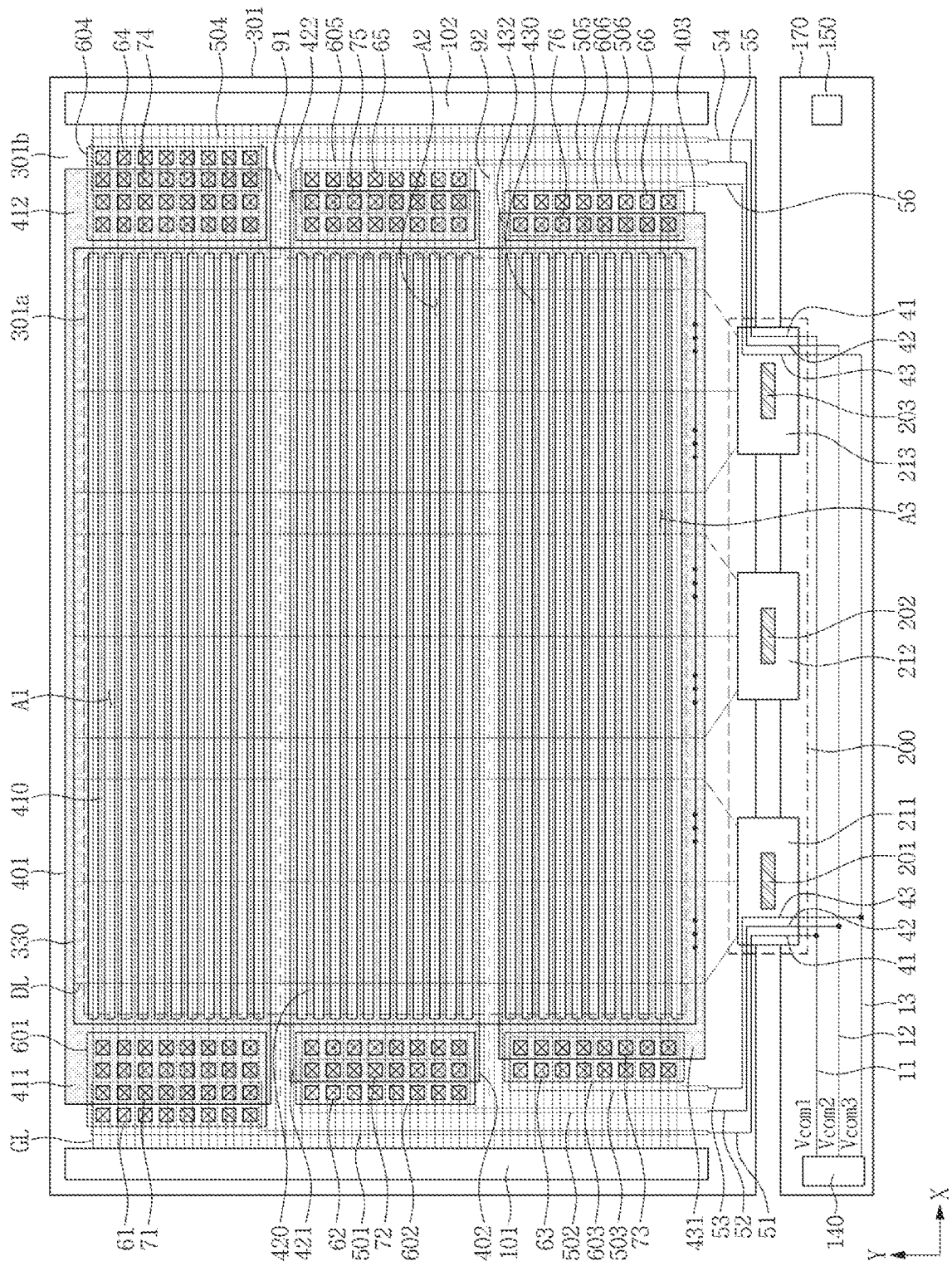
FIG. 2 is a view of the display device of FIG. 1 further illustrating gate lines and data lines.
Figure 3:
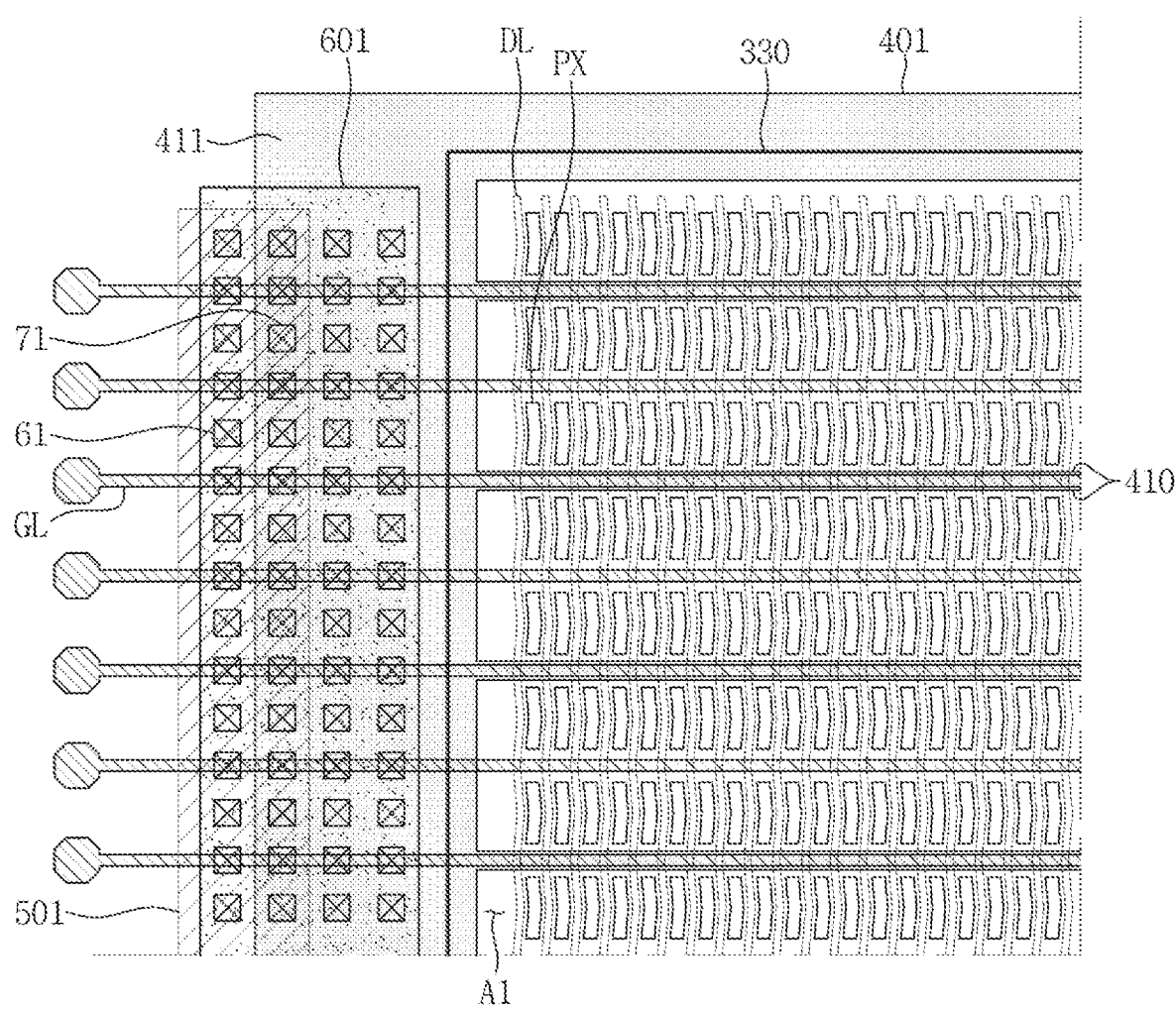
FIG. 3 is a view enlarging a first auxiliary electrode, a first common line and a first connection electrode illustrated in FIG. 2 and a periphery portion thereof.

FIG. 1 is a view illustrating a display device according to an exemplary embodiment, FIG. 2 is a view of the display device of FIG. 1 further illustrating gate lines and data lines and FIG. 3 is a view enlarging a first auxiliary electrode, a first common line and a first connection electrode illustrated in FIG. 2 and a periphery portion thereof.

As illustrated in FIGS. 1 and 2, the display device according to an exemplary embodiment includes a first substrate 301, a first gate driver 101, a second gate driver 102, a data driver 200, a printed circuit board ("PCB") 170, a timing controller 150, a power supply unit 140, a common electrode 330, a plurality of gate lines GL, a plurality of data lines DL, a first auxiliary electrode 401, a second auxiliary electrode 402, a third auxiliary electrode 403, a first common line 501, a second common line 502, a third common line 503, a fourth common line 504, a fifth common line 505, a sixth common line 506, a first connection electrode 601, a second connection electrode 602, a third connection electrode 603, a fourth connection electrode 604, a fifth connection electrode 605 and a sixth connection electrode 606.

As illustrated in FIG. 1, the first substrate 301 includes a display area 301a and a non-display area 301b. As illustrated in FIG. 3, a plurality of pixels PX are arranged in the display area 301a.

The plurality of pixels PX may be divided into a plurality of different pixel groups. For example, when the common electrode 330 includes a first area A1, a second area A2 and a third area A3, as illustrated in FIG. 1, a part of the plurality of pixels PX are arranged in a first pixel group, another part of the plurality of pixels PX are arranged in a second pixel group and still another part of the plurality of pixels PX are arranged in a third pixel group. The pixels of the first pixel group may include a plurality of pixel electrodes (hereinafter, "first pixel electrodes") overlapping the first area A1 of the common electrode 330, the pixels of the second pixel group include a plurality of pixel electrodes (hereinafter, "second pixel electrodes") overlapping the second area A2 of the common electrode 330 and the pixels of the third pixel group include a plurality of pixel electrodes (hereinafter, "third pixel electrodes") overlapping the third area A3 of the common electrode 330. The first pixel electrodes, the second pixel electrodes and the third pixel electrodes may have a substantially equal size and a substantially equal shape.

The number of areas of the common electrode 330 may be substantially equal to the number of pixel groups described above. For example, when the number of pixel groups is n, the number of areas is n, wherein n is a natural number greater than one.

The timing controller 150 may receive a vertical synchronization signal, a horizontal synchronization signal, an image data signal, and a reference clock signal, which may be output from a graphic controller provided in a system (not illustrated).

An interface circuit (not illustrated) may be provided between the timing controller 150 and the system, and the aforementioned signals output from the system may be input to the timing controller 150 through the interface circuit. The interface circuit may be embedded in the timing controller 150.

Although not illustrated, the interface circuit may include a low voltage differential signaling (LVDS) receiver. The interface circuit may lower voltage levels of the vertical synchronization signal, the horizontal synchronization signal, the image data signal, and the reference clock signal output from the system, while raising frequencies thereof.

In an exemplary embodiment, electromagnetic interference (EMI) may occur due to high frequency components of the signal input to the timing controller 150 from the interface circuit. In order to substantially prevent the EMI, an EMI filter (not illustrated) may be further provided between the interface circuit and the timing controller 150.

The timing controller 150 may generate a gate control signal for controlling the first gate driver 101, the second gate driver 102, and a data control signal for controlling the data driver 200, using the vertical synchronization signal, the horizontal synchronization signal, and the reference clock signal.

The gate control signal may include a gate start pulse, a gate shift clock, a gate output enable signal, and the like.

The data control signal may include a source start pulse, a source shift clock, a source output enable signal, and the like.

In addition, the timing controller 150 may rearrange the image data signals input through the system and apply the rearranged image data signals to the data driver 200.

In an exemplary embodiment, the timing controller 150 is operated by a driving power output from a power unit provided in the system. For example, the driving power may be used as a power voltage of a phase lock loop ("PLL") circuit embedded in the timing controller 150.

The PLL circuit may compare a reference clock signal input to the timing controller 150 with a reference frequency generated from an oscillator. Then, in the case where it is identified from the comparison that there is a deviation between them, the PPL circuit may adjust the frequency of the reference clock signal by the difference to generate a sampling clock signal. This sampling clock signal may be a signal for sampling the image data signals.

The power supply unit 140 may increase or decrease the driving power input through the system to generate various voltages required for the display device. The power supply unit 140 may be a DC-DC converter.

The power supply unit 140 may include, for example, an output switching element for switching an output voltage of an output terminal thereof and a pulse width modulator PWM for adjusting a duty ratio or a frequency of a control signal applied to a control terminal of the output switching element so as to increase or decrease the output voltage. Herein, the power supply unit 140 may include a pulse frequency modulator PFM, instead of the pulse width modulator PWM.

The pulse width modulator PWM may increase the duty ratio of the aforementioned control signal to raise the output voltage of the power supply unit 140 or decrease the duty ratio of the control signal to lower the output voltage of the power supply unit 140. The pulse frequency modulator PFM may increase the frequency of the aforementioned control signal to raise the output voltage of the power supply unit 140 or decrease the frequency of the control signal to lower the output voltage of the power supply unit 140.

The output voltage of the power supply unit 140 may include a plurality of common voltages. For example, the output voltage may include a first common voltage Vcom1, a second common voltage Vcom2, and a third common voltage Vcom3. Each of the first common voltage Vcom1, the second common voltage Vcom2, and the third common voltage Vcom3, is a DC voltage. The first common voltage Vcom1, the second common voltage Vcom2, and the third common voltage Vcom3, may all have a substantially same magnitude. Alternatively, at least two of the first common voltage Vcom1, the second common voltage Vcom2, and the third common voltage Vcom3, may have different magnitudes. For example, the first common voltage Vcom1 may be the highest, the third common voltage Vcom3 may be the lowest, and the second common voltage Vcom2 may be lower than the first common voltage Vcom1 and higher than the third common voltage Vcom3.

In addition, the output voltage of the power supply unit 140, although not illustrated, may further include a reference voltage, gamma reference voltages, a gate high voltage and a gate low voltage.

The gamma reference voltages may be voltages generated by voltage division of the reference voltage. The gamma reference voltages may be analog voltages, which are applied to the data driver 200.

The gate high voltage may be a high logic voltage of a gate signal set to be substantially equal to or higher than a threshold voltage of a pixel switching element provided in the pixel PX and the gate low voltage may be a low logic voltage of the gate signal set to be an off voltage of the pixel switching element. The gate high voltage may be applied to each of the first gate driver 101 and the second gate driver 102.

The first gate driver 101 and the second gate driver 102 may be located at the first substrate 301. For example, the first gate driver 101 is located at a portion of the non-display area 301b between one edge of the first substrate 301 and the common electrode 330 and the second gate driver 102 is located at a portion of the non-display area 301b between another edge of the first substrate 301 and the common electrode 330. In such an exemplary embodiment, one edge of the first substrate 301 and another edge of the first substrate 301 may be faced opposite from each other.

The first gate driver 101 may generate gate signals according to a gate control signal provided from the timing controller 150 and sequentially apply the gate signals to the plurality of gate lines GL. In such an exemplary embodiment, as illustrated in FIG. 2, the first gate driver 101 is connected to one end of each of the gate lines GL.

The first gate driver 101 may include, for example, a shift register that shifts the gate start pulse according to the gate shift clock to generate the gate signals. The shift register may include a plurality of driving switching elements. The driving switching elements may be formed at the non-display area 301b of the first substrate 301 through a process substantially the same as a process through which a switching element (the pixel switching element) at the display area 301a of the first substrate 301 is formed.

The second gate driver 102 may generate gate signals according to the gate control signal provided from the timing controller 150 and sequentially applies the gate signals to the plurality of gate lines GL. In such an exemplary embodiment, as illustrated in FIG. 2, the second gate driver 102 is connected to another end of each of the gate lines GL.

The second gate driver 102 may include, for example, a shift register that shifts the gate start pulse according to the gate shift clock to generate the gate signals. The shift register may include a plurality of driving switching elements. The driving switching elements may be formed at the non-display area 301b of the first substrate 301 through a process substantially the same as a process through which a switching element (the pixel switching element) at the display area 301a of the first substrate 301 is formed.

The data driver 200 may receive the image data signals and the data control signal from the timing controller 150. The data driver 200 may sample the image data signals according to the data control signal, sequentially latch the sampled image data signals corresponding to one horizontal line in each horizontal period, and apply the latched image data signals to the data lines DL substantially simultaneously. For example, the data driver 200 converts the image data signals applied from the timing controller 150 into analog image data signals using the gamma reference voltages input from the power supply unit 140 and applies the analog image data signals to the data lines DL.

The data driver 200 may include a plurality of data driving integrated circuits ("ICs") 201, 202, and 203. The data driving ICs 201, 202, and 203 may receive digital image data signals and the data control signal from the timing controller 150. The data driving ICs 201, 202, and 203 may sample the digital image data signals according to the data control signal, latch the sampled image data signals corresponding to one horizontal line in each horizontal period, and apply the latched image data signals to the data lines DL. That is, the data driving ICs 201, 202, and 203 may convert the digital image data signals from the timing controller 150 into analog image signals using the gamma voltage input from the power supply unit 140.

Respective ones of the data driving ICs 201, 202, and 203 are mounted at data carriers 211, 212, and 213. The data carriers 211, 212, and 213 are connected between the PCB 170 and the first substrate 301. For example, each of the data carriers 211, 212, and 213 may be electrically connected between the PCB 170 and the non-display area 301b of the first substrate 301.

Although not illustrated, respective ones of the data carriers 211, 212, and 213 may include input lines for transmitting various signals provided from the timing controller 150 and the power supply unit 140 to corresponding ones of the data driving ICs 201, 202, and 203, and output lines for transmitting the image data signals provided from the respective data driving ICs 201, 202, and 201 to corresponding ones of the data lines DL. In an exemplary embodiment, at least one data carrier may further include first, second, and third dummy lines 41, 42, and 43 for transmitting the first, second and third common voltages Vcom1, Vcom2, and Vcom3 provided from the power supply unit 140 to the first substrate 301, and the first, second, and third dummy lines 41, 42, and 43 may be connected to panel lines 51, 52, 53, 54, 55 and, 56 located at the first substrate 301. For example, a first data carrier 211 includes the first, second and third dummy lines 41, 42 and 43. In such an exemplary embodiment, a first dummy line 41 of the first data carrier 211 is connected to a first panel line 51, a second dummy line 42 of the first data carrier 211 is connected to a second panel line 52 and a third dummy line 43 of the first data carrier 211 is connected to a third panel line 53. In addition, a third data carrier 213 may include the first, second and third dummy lines 41, 42 and 43. In such an exemplary embodiment, a first dummy line 41 of the third data carrier 213 is connected to a fourth panel line 54, a second dummy line 42 of the third data carrier 213 is connected to a fifth panel line 55, and a third dummy line 43 of the third data carrier 213 is connected to a sixth panel line 56.

The first panel line 51 may be connected to the first common line 501, the second panel line 52 may be connected to the second common line 502, the third panel line 53 may be connected to the third common line 502, the fourth panel line 54 may be connected to the fourth common line 504, the fifth panel line 55 may be connected to the fifth common line 505, and the sixth panel line 56 may be connected to the sixth common line 506. Each of the panel lines 51, 52, 53, 54, 55, and 56 may be formed on the non-display area 301b of the first substrate 301 in a line-on-glass manner.

The first panel line 51 and the first common line 501 may include a substantially same material or may include different materials from each other, the second panel line 52 and the second common line 502 may include a substantially same material or may include different materials from each other, the third panel line 53 and the third common line 503 may include a substantially same material or may include different materials from each other, the fourth panel line 54 and the fourth common line 504 may include a substantially same material or may include different materials from each other, the fifth panel line 55 and the fifth common line 505 may include a substantially same material or may include different materials from each other, and the sixth panel line 56 and the sixth common line 506 may include a substantially same material or may include different materials from each other.

The timing controller 150 and the power supply unit 140 described above may be located on the PCB 170. The PCB 170 may include a plurality of pattern lines 11, 12, and 13. For example, the PCB 170 includes a first pattern line 11, a second pattern line 12, and a third pattern line 13. Each of the pattern lines 11, 12, and 13 may be connected to the power supply unit 140. For example, the first pattern line 11 may be connected to a first output terminal of the power supply unit 140 from which the first common voltage Vcom1 is output, the second pattern line 12 may be connected to a second output terminal of the power supply unit 140 from which the second common voltage Vcom2 is output, and the third pattern line 13 may be connected to a third output terminal of the power supply unit 140 from which the third common voltage Vcom3 is output.

The first pattern line 11 may be connected to the first dummy line 41 of the first data carrier 211 and the first dummy line 41 of the third data carrier 213, the second pattern line 12 may be connected to the second dummy line 42 of the first data carrier 211 and the second dummy line 42 of the third data carrier 213, and the third pattern line 13 may be connected to the third dummy line 43 of the first data carrier 211 and the third dummy line 43 of the third data carrier 213.

As illustrated in FIG. 2, each of the gate lines GL is elongated along an X-axis direction. In addition, the gate lines GL are arranged along a Y-axis direction. The gate lines GL may extend to the non-display area 301b and are connected to the first gate driver 101 and the second gate driver 102. For example, one end of each of the gate lines GL is connected to the first gate driver 101 and another end of each of the gate lines GL is connected to the second gate driver 102.

As illustrated in FIG. 2, each of the data lines DL may be elongated along the Y-axis direction. In addition, the data lines DL may be arranged along the X-axis direction. The data lines DL may cross the gate lines GL. The data lines DL may extend to the non-display area 301b and may be connected to the data driver 200.

As illustrated in FIG. 1, the common electrode 330 is located on the first substrate 301. The common electrode 330 may overlaps the display area 301a of the first substrate 301 and the non-display area 301b thereof. For example, the common electrode 330 overlaps an entire area of the display area 301a and a part of the non-display area 301b.

The display device according to an exemplary embodiment may include two or more auxiliary electrodes separated from each other. For example, as illustrated in FIG. 1, the display device according to an exemplary embodiment may include three auxiliary electrodes 401, 402, and 403 separated from each other. However, the display device according to an exemplary embodiment may also include four or more auxiliary electrodes separated from each other.

As illustrated in FIG. 1, the first, second, and third auxiliary electrodes 401, 402, and 403 separated from each other are located on the common electrode 330. The first, second, and third auxiliary electrodes 401, 402, and 403 are connected to the common electrode 330. The first, second, and third auxiliary electrodes 401, 402, and 403 are connected directly to the common electrode 330. In other words, the first, second, and third auxiliary electrodes 401, 402, and 403 are in direct contact with the common electrode 330.

The first, second, and third auxiliary electrodes 401, 402, and 403 are located at different portions of the common electrode 330. For example, the common electrode 330 may be divided into three areas A1, A2, and A3, the number of which are equal to the number of auxiliary electrodes. In such an exemplary embodiment, the first auxiliary electrode 401 may overlap the first area A1, the second auxiliary electrode 402 may overlap the second area A2, and the third auxiliary electrode 403 may overlap the third area A3. In other words, the first auxiliary electrode 401 may contact the common electrode 330 at the first area A1, the second auxiliary electrode 402 may contact the common electrode 330 at the second area A2, and the third auxiliary electrode 403 may contact the common electrode 330 at the third area A3.

As illustrated in FIG. 1, the common electrode 330 may be divided into the first, second, and third areas A1, A2, and A3 by a first imaginary line 91 and a second imaginary line 92 which are parallel to each other. For example, an area between the first imaginary line 91 and an upper edge of the common electrode 330 is defined as the first area A1, an area between the first imaginary line 91 and the second imaginary line 92 is defined as the second area A2, and an area between the second imaginary line 92 and a lower edge of the common electrode 330 is defined as the third area A3. In such an exemplary embodiment, the first imaginary line 91 is located closer to the upper edge of the common electrode 330 and the second imaginary line 92 is located closer to the lower edge of the common electrode 330.

The number of areas of the common electrode 330 may be substantially equal to the number of auxiliary electrodes described above. For example, when the number of auxiliary electrodes is n, the number of areas is n.

As illustrated in FIG. 1, the first, second, and third areas A1, A2, and A3 may have a substantially equal size. Alternatively, at least two of the first, second and third areas A1, A2, and A3 may have different sizes from each other. For example, the first area A1 may have a larger planar area than a planar area of the second area A2 and the second area A2 may have a larger planar area than a planar area of the third area A3.

The first auxiliary electrode 401 may include at least one auxiliary line (hereinafter, "a first auxiliary line 410") and at least one connection portion 411 and 412. For example, as illustrated in FIG. 1, the first auxiliary electrode 401 may include a plurality of first auxiliary lines 410, a first connection portion 411, and a second connection portion 412. The first auxiliary line 410 may be located on the common electrode 330. For example, the first auxiliary line 410 may be located at the first area A1 of the common electrode 330. In addition, the first auxiliary line 410 may be located between the first connection portion 411 of the first auxiliary electrode 401 and the second connection portion 412 thereof. The first connection portion 411 of the first auxiliary electrode 401 may connect one end portion of each of the first auxiliary lines 410 to each other and the second connection portion 412 of the first auxiliary electrode 401 may connect another end portion of each of the first auxiliary lines 410 to each other. As illustrated in FIG. 1, the first auxiliary lines 410, the first connection portion 411, and the second connection portion 412 of the first auxiliary electrode 401 may be unitary.

As illustrated in FIGS. 2 and 3, the first auxiliary line 410 overlaps the gate line GL. The first auxiliary line 410 may be located along the gate line GL. In other words, the first auxiliary line 410 may be elongated along the X-axis direction. In such an exemplary embodiment, the first auxiliary line 410 may overlap an odd-numbered gate line among gate lines GL located at the first area A1. In other words, the first auxiliary line 410 may overlap an odd-numbered gate line and may not overlap an even-numbered gate line. Alternatively, the first auxiliary line 410 may overlap the even-numbered gate line and may not overlap the odd-numbered gate line.

A distance d1 between adjacent ones of the first auxiliary lines 410 may be substantially equal to each other. In other words, a distance between one of the first auxiliary lines 410 and another of the first auxiliary lines 410 above and adjacent to said one of the first auxiliary lines 410 may be substantially equal to a distance between said one of the first auxiliary lines 410 and still another of the first auxiliary lines 410 below and adjacent to said one of the first auxiliary lines 410.

As illustrated in FIG. 1, the first auxiliary lines 410 may all have a substantially equal width (e.g., a line width). In such an exemplary embodiment, the width means a size in the Y-axis direction.

As illustrated in FIG. 1, the first auxiliary lines 410 may all have a substantially equal length. In such an exemplary embodiment, the length means a size in the X-axis direction.

The second auxiliary electrode 402 may include at least one auxiliary line (hereinafter, "a second auxiliary line 420") and at least one connection portion 421 and 422. For example, as illustrated in FIG. 1, the second auxiliary electrode 402 may include a plurality of second auxiliary lines 420, a first connection portion 421, and a second connection portion 422. The second auxiliary line 420 may be located on the common electrode 330. For example, the second auxiliary line 420 may be located at the second area A2 of the common electrode 330. In addition, the second auxiliary line 420 may be located between the first connection portion 421 of the second auxiliary electrode 402 and the second connection portion 422 thereof. The first connection portion 421 of the second auxiliary electrode 402 may connect one end portion of each of the second auxiliary lines 420 to each other and the second connection portion 422 of the second auxiliary electrode 402 may connect another end portion of each of the second auxiliary lines 420 to each other. As illustrated in FIG. 1, the second auxiliary lines 420, the first connection portion 421 and the second connection portion 422 of the second auxiliary electrode 402 may be unitary.

As illustrated in FIGS. 2 and 3, the second auxiliary line 420 overlaps the gate line GL. The second auxiliary line 420 may be located along the gate line GL. In other words, the second auxiliary line 420 may be elongated along the X-axis direction. In such an exemplary embodiment, the second auxiliary line 420 may overlap an odd-numbered gate line among gate lines GL located at the second area A2. In other words, the second auxiliary line 420 may overlap an odd-numbered gate line and may not overlap an even-numbered gate line. Alternatively, the second auxiliary line 420 may overlap the even-numbered gate line and may not overlap the odd-numbered gate line.

A distance d1 between adjacent ones of the second auxiliary lines 420 may be substantially equal to each other. In other words, a distance between one of the second auxiliary lines 420 and another of the second auxiliary lines 420 above and adjacent to said one of the second auxiliary lines 420 may be substantially equal to a distance between said one of the second auxiliary lines 420 and another of the second auxiliary lines 420 below and adjacent to said one of the second auxiliary lines 420.

As illustrated in FIG. 1, the second auxiliary lines 420 may all have a substantially equal width (e.g., a line width). In such an exemplary embodiment, the width means a size in the Y-axis direction.

As illustrated in FIG. 1, the second auxiliary lines 420 may all have a substantially equal length. In such an exemplary embodiment, the length means a size in the X-axis direction.

The third auxiliary electrode 403 may include at least one auxiliary line (hereinafter, "a third auxiliary line 430") and at least one connection portion 431 and 432. For example, as illustrated in FIG. 1, the third auxiliary electrode 403 may include a plurality of third auxiliary lines 430, a first connection portion 431, and a second connection portion 432. The third auxiliary line 430 may be located on the common electrode 330. For example, the third auxiliary line 430 i may be s located at the third area A3 of the common electrode 330. In addition, the third auxiliary line 430 may be located between the first connection portion 431 of the third auxiliary electrode 403 and the second connection portion 432 thereof. The first connection portion 431 of the third auxiliary electrode 403 may connect one end portion of each of the third auxiliary lines 430 to each other and the second connection portion 432 of the third auxiliary electrode 403 may connect another end portion of each of the third auxiliary lines 430 to each other. As illustrated in FIG. 1, the third auxiliary lines 430, the first connection portion 431, and the second connection portion 432 of the third auxiliary electrode 403 may be unitary.

As illustrated in FIGS. 2 and 3, the third auxiliary line 430 may overlap the gate line GL. For example, the third auxiliary line 430 may overlap a gate line located at the third area A3. The third auxiliary line 430 may be located along the gate line GL. In other words, the third auxiliary line 430 may be elongated along the X-axis direction. In such an exemplary embodiment, the third auxiliary line 430 may overlap an odd-numbered gate line among the gate lines GL located at the third area A3. In other words, the third auxiliary line 430 may overlap an odd-numbered gate line and may not overlap an even-numbered gate line. On the contrary, the third auxiliary line 430 may overlap the even-numbered gate line and may not overlap the odd-numbered gate line.

A distance d1 between adjacent ones of the third auxiliary lines 430 may be substantially equal to each other. In other words, a distance between one of the third auxiliary lines 430 and another of the third auxiliary lines 430 above and adjacent to said one of the third auxiliary lines 430 may be substantially equal to a distance between said one of the third auxiliary lines 430 and another of the third auxiliary lines 430 below and adjacent to said one of the third auxiliary lines 430.

As illustrated in FIG. 1, the third auxiliary lines 430 may all have a substantially equal width (e.g., a line width). In such an exemplary embodiment, the width means a size in the Y-axis direction.

As illustrated in FIG. 1, the third auxiliary lines 430 may all have a substantially equal length. In such an exemplary embodiment, the length means a size in the X-axis direction.

In an exemplary embodiment, the distance d1 between adjacent ones of the first auxiliary lines 410, the distance d1 between adjacent ones of the second auxiliary lines 420, and the distance d1 between adjacent ones of the third auxiliary lines 430 may be substantially equal to each other.

A distance between different auxiliary lines adjacent to each other may be different from a distance between auxiliary lines at a same area. For example, as illustrated in FIG. 1, a distance d2 between a first auxiliary line 410 and a second auxiliary line 420 that are adjacent to each other may be greater than the distance d1 between adjacent ones of the first auxiliary lines 410. Similarly, a distance d2 between the second auxiliary line 420 and the third auxiliary line 430 that are adjacent to each other may be greater than the distance d1 between adjacent ones of the first auxiliary lines 410.

Since a boundary portion between adjacent areas may be adjacent to auxiliary lines supplied with common voltages of different magnitudes, a luminance of the boundary portion may have a large difference from a luminance of another area. However, as described above, when the distance between different auxiliary lines that are adjacent to each other is greater, the luminance deviation between each area and the boundary portion between adjacent areas may be substantially minimized.

In an exemplary embodiment, the first auxiliary line 410, the second auxiliary line 420, and the third auxiliary line 430 may have a substantially equal width (e.g., a line width).

The first common line 501 may be located at the non-display area 301b. At least a portion of the first common line 501 may be located between the first gate driver 101 and the common electrode 330. The first common line 501 may be connected to one edge of the first auxiliary electrode 401. In other words, the first common line 501 may be connected to the first connection portion 411 of the first auxiliary electrode 401. In such an exemplary embodiment, the first common line 501 is connected to the first connection portion 411 of the first auxiliary electrode 401 through a first common contact hole 61, a first auxiliary contact hole 71, and the first connection electrode 601.

The second common line 502 may be located at the non-display area 301b. At least a portion of the second common line 502 may be located between the first gate driver 101 and the common electrode 330. For example, at least a portion of the second common line 502 may be located between the first common line 501 and the common electrode 330. The second common line 502 may be connected to one edge of the second auxiliary electrode 402. In other words, the second common line 502 may be connected to the first connection portion 421 of the second auxiliary electrode 402. In such an exemplary embodiment, the second common line 502 may be connected to the first connection portion 421 of the second auxiliary electrode 402 through a second common contact hole 62, a second auxiliary contact hole 72, and the second connection electrode 602.

The third common line 503 may be located at the non-display area 301b. At least a portion of the third common line 503 may be located between the first gate driver 101 and the common electrode 330. For example, at least a portion of the third common line 503 may be located between the second common line 502 and the common electrode 330. The third common line 503 may be connected to one edge of the third auxiliary electrode 403. In other words, the third common line 503 may be connected to the first connection portion 431 of the third auxiliary electrode 403. In such an exemplary embodiment, the third common line 503 may be connected to the first connection portion 431 of the third auxiliary electrode 403 through a third common contact hole 63, a third auxiliary contact hole 73, and the third connection electrode 603.

The fourth common line 504 may be located at the non-display area 301b. At least a portion of the fourth common line 504 may be located between the second gate driver 102 and the common electrode 330. The fourth common line 504 may be connected to another edge of the first auxiliary electrode 401. In other words, the fourth common line 504 may be connected to the second connection portion 412 of the first auxiliary electrode 401. In such an exemplary embodiment, the fourth common line 504 may be connected to the second connection portion 412 of the first auxiliary electrode 401 through a fourth common contact hole 64, a fourth auxiliary contact hole 74, and the fourth connection electrode 604.

The fifth common line 505 may be located at the non-display area 301b. At least a portion of the fifth common line 505 may be located between the second gate driver 102 and the common electrode 330. For example, at least a portion of the fifth common line 505 may be located between the fourth common line 504 and the common electrode 330. The fifth common line 505 may be connected to another edge of the second auxiliary electrode 402. In other words, the fifth common line 505 may be connected to the second connection portion 422 of the second auxiliary electrode 402. In such an exemplary embodiment, the fifth common line 505 may be connected to the second connection portion 422 of the second auxiliary electrode 402 through a fifth common contact hole 65, a fifth auxiliary contact hole 75, and the fifth connection electrode 605.

The sixth common line 506 may be located at the non-display area 301b. At least a portion of the sixth common line 506 may be located between the second gate driver 102 and the common electrode 330. For example, at least a portion of the sixth common line 506 may be located between the fifth common line 505 and the common electrode 330. The sixth common line 506 may be connected to another edge of the third auxiliary electrode 403. In other words, the sixth common line 506 may be connected to the second connection portion 432 of the third auxiliary electrode 403. In such an exemplary embodiment, the sixth common line 506 may be connected to the second connection portion 432 of the third auxiliary electrode 403 through a sixth common contact hole 66, a sixth auxiliary contact hole 76, and the sixth connection electrode 606.

In an exemplary embodiment, the fourth common line 504, the fifth common line 505, and the sixth common line 506 described above may not be included in the display device according to an exemplary embodiment.

The number of common lines connected to one side of respective edges of the auxiliary electrodes may be substantially equal to the number of auxiliary electrodes described above. For example, when the number of auxiliary electrodes is n, the number of common lines connected to one side of respective edges of the auxiliary electrodes is n.

The first auxiliary electrode 401 may receive the first common voltage Vcom1, the second auxiliary electrode 402 may receive the second common voltage Vcom2, and the third auxiliary electrode 403 may receive the third common voltage Vcom3. To this end, for example, the first auxiliary electrode 401 may be connected to the power supply unit 140 through the first common line 501 and the fourth common line 504, the second auxiliary electrode 402 may be connected to the power supply unit 140 through the second common line 502 and the fifth common line 505, and the third auxiliary electrode 403 may be connected to the power supply unit 140 through the third common line 503 and the sixth common line 506.

The number of common voltages may be substantially equal to the number of auxiliary electrodes described above. For example, when the number of auxiliary electrodes is n, the number of common voltages is n.

The first connection electrode 601 may connect the first common line 501 and the first connection portion 411 of the first auxiliary electrode 401 to each other. For example, one side of the first connection electrode 601 may be connected to the first common line 501 through the first common contact hole 61 and another side of the first connection electrode 601 may be connected to the first connection portion 411 through the first auxiliary contact hole 71.

The second connection electrode 602 may connect the second common line 502 and the first connection portion 421 of the second auxiliary electrode 402 to each other. For example, one side of the second connection electrode 602 may be connected to the second common line 502 through the second common contact hole 62 and another side of the second connection electrode 602 may be connected to the first connection portion 421 through the second auxiliary contact hole 72.

The third connection electrode 603 may connect the third common line 503 and the first connection portion 431 of the third auxiliary electrode 403 to each other. For example, one side of the third connection electrode 603 may be connected to the third common line 503 through the third common contact hole 63 and another side of the third connection electrode 603 may be connected to the first connection portion 431 through the third auxiliary contact hole 73.

The fourth connection electrode 604 may connect the fourth common line 504 and the second connection portion 412 of the first auxiliary electrode 401 to each other. For example, one side of the fourth connection electrode 604 may be connected to the fourth common line 504 through the fourth common contact hole 64 and another side of the fourth connection electrode 604 may be connected to the second connection portion 412 through the fourth auxiliary contact hole 74.

The fifth connection electrode 605 may connect the fifth common line 505 and the second connection portion 422 of the second auxiliary electrode 402 to each other. For example, one side of the fifth connection electrode 605 may be connected to the fifth common line 505 through the fifth common contact hole 65 and another side of the fifth connection electrode 605 may be connected to the second connection portion 422 through the fifth auxiliary contact hole 75.

The sixth connection electrode 606 may connect the sixth common line 506 and the second connection portion 432 of the third auxiliary electrode 403 to each other. For example, one side of the sixth connection electrode 606 may be connected to the sixth common line 506 through the sixth common contact hole 66 and another side of the sixth connection electrode 606 may be connected to the second connection portion 432 through the sixth auxiliary contact hole 76.

The first, second, and third connection electrodes 601, 602, and 603 may increase in size as the distance from the data driver 200 increases. For example, the first connection electrode 601 located farthest from the data driver 200 may have a larger planar area and the third connection electrode 603 located closest to the data driver 200 may have a smaller planar area. In addition, the second connection electrode 602 between the first connection electrode 601 and the third connection electrode 603 may have a planar area less than the planar area of the first connection electrode 601 and larger than the planar area of the third connection electrode 603.

The fourth, fifth, and sixth connection electrodes 604, 605, and 606 may increase in size as the distance from the data driver 200 increases. For example, the fourth connection electrode 604 located farthest from the data driver 200 may have a largest planar area and the sixth connection electrode 606 located closest to the data driver 200 may have a smallest planar area. In addition, the fifth connection electrode 605 between the fourth connection electrode 604 and the sixth connection electrode 606 may have a planar area less than the planar area of the fourth connection electrode 604 and larger than the planar area of the sixth connection electrode 606.

An overlap portion (hereinafter, "a first overlap portion") between the first connection electrode 601 and the first auxiliary electrode 401, an overlap portion (hereinafter, "a second overlap portion") between the second connection electrode 602 and the second auxiliary electrode 402, and an overlap portion (hereinafter, "a third overlap portion") between the third connection electrode 603 and the third auxiliary electrode 403 may increase in size as the distance from the data driver 200 increases. For example, the first overlap portion located farthest from the data driver 200 may have a largest planar area and the third overlap portion located closest to the data driver 200 may have a smallest planar area. In addition, the second overlap portion between the first overlap portion and the third overlap portion may have a planar area less than the planar area of the first overlap portion and larger than the planar area of the third overlap portion.

An overlap portion (hereinafter, "a fourth overlap portion") between the fourth connection electrode 604 and the first auxiliary electrode 401, an overlap portion (hereinafter, "a fifth overlap portion") between the fifth connection electrode 605 and the second auxiliary electrode 402, and an overlap portion (hereinafter, "a sixth overlap portion") between the sixth connection electrode 606 and the third auxiliary electrode 403 may increase in size as the distance from the data driver 200 increases. For example, the fourth overlap portion located farthest from the data driver 200 may have a largest planar area and the sixth overlap portion located closest to the data driver 200 may have a smallest planar area. In addition, the fifth overlap portion between the fourth overlap portion and the sixth overlap portion may have a planar area less than the planar area of the fourth overlap portion and larger than the planar area of the sixth overlap portion.

The overlap portion may overlap a greater number of auxiliary contact holes as the distance from the data driver 200 increases. For example, the first overlap portion located furthest from the data driver 200 may overlap a greatest number of first auxiliary contact holes 71 and the third overlap portion located closest to the data driver 200 may overlap a smallest number of third auxiliary contact holes 73. In addition, the second overlap portion between the first overlap portion and the third overlap portion may overlap second auxiliary contact holes 72 of which the number is less than the number of first auxiliary contact holes 71 and larger than the number of third auxiliary contact holes 73. As another example, the fourth overlap portion located farthest from the data driver 200 may overlap a greatest number of fourth auxiliary contact holes 74 and the sixth overlap portion located closest to the data driver 200 may overlap a smallest number of sixth auxiliary contact holes 76. In addition, the fifth overlap portion between the fourth overlap portion and the sixth overlap portion may overlap fifth auxiliary contact holes 75 of which the number is less than the number of fourth auxiliary contact holes 74 and larger than the number of sixth auxiliary contact holes 76.

The first common voltage Vcom1 output from the power supply unit 140 may be applied to the first area A1 of the common electrode 330 through the first pattern line 11, the first dummy line 41 of the first data carrier 211, the first panel line 51, the first common line 501, the first connection electrode 601, and the first auxiliary electrode 401.

The second common voltage Vcom2 output from the power supply unit 140 may be applied to the second area A2 of the common electrode 330 through the second pattern line 12, the second dummy line 42 of the first data carrier 211, the second panel line 52, the second common line 502, the second connection electrode 602, and the second auxiliary electrode 402.

The third common voltage Vcom3 output from the power supply unit 140 may be applied to the third area A3 of the common electrode 330 through the third pattern line 13, the third dummy line 43 of the first data carrier 211, the third panel line 53, the third common line 503, the third connection electrode 603, and the third auxiliary electrode 403.

In addition, the first common voltage Vcom1 output from the power supply unit 140 may be applied to the first area A1 of the common electrode 330 through the first pattern line 11, the first dummy line 41 of the third data carrier 213, the fourth panel line 54, the fourth common line 504, the fourth connection electrode 604, and the first auxiliary electrode 401.

In addition, the second common voltage Vcom2 output from the power supply unit 140 may be applied to the second area A2 of the common electrode 330 through the second pattern line 12, the second dummy line 42 of the third data carrier 213, the fifth panel line 55, the fifth common line 505, the fifth connection electrode 605, and the second auxiliary electrode 402.

In addition, the third common voltage Vcom3 output from the power supply unit 140 may be applied to the third area A3 of the common electrode 330 through the third pattern line 13, the third dummy line 43 of the third data carrier 213, the sixth panel line 56, the sixth common line 506, the sixth connection electrode 606, and the third auxiliary electrode 403.

As such, the first common voltage Vcom1 may be applied to the first area A1 of the common electrode 330, the second common voltage Vcom2 may be applied to the second area A2 of the common electrode 330, and the third common voltage Vcom3 may be applied to the third area A3 of the common electrode 330. In such a manner, a common voltage may be independently applied to each area of the common electrode 330. Accordingly, a common voltage having an optimum level may be independently applied to each of the areas A1, A2, and A3 of the common electrode 330. Accordingly, a deviation of a kickback voltage in the display area 301a corresponding to each area of the common electrode 330 may be substantially minimized and the image quality may be improved.

Figure 4:
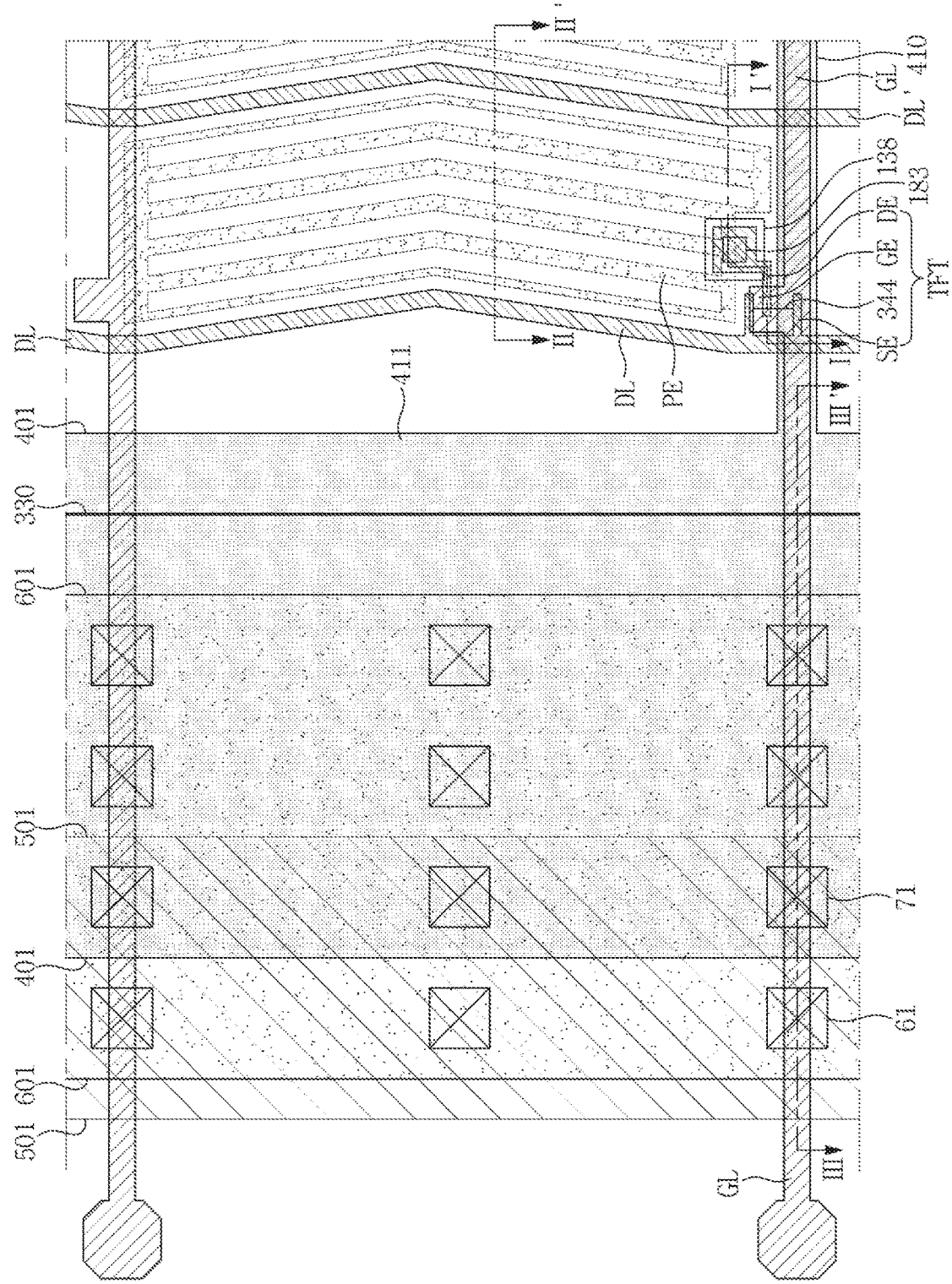
FIG. 4 is a view enlarging one of pixels illustrated in FIG. 3 and a periphery portion thereof.
Figure 5:
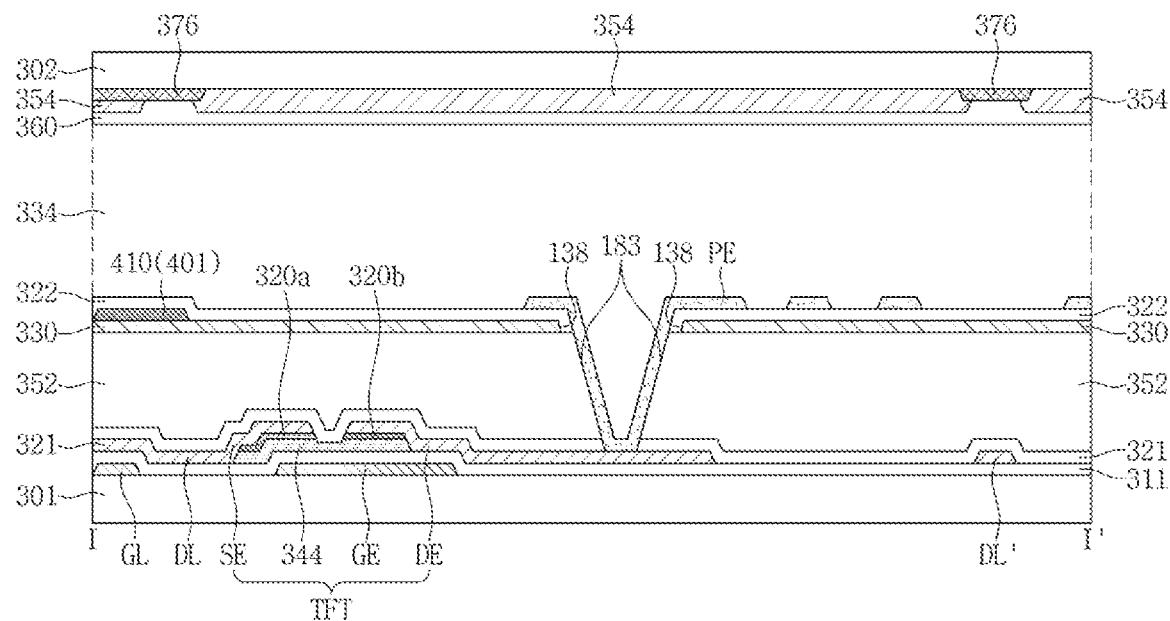
FIG. 5 is a cross-sectional view taken along the line I-I' of FIG. 4.
Figure 6:
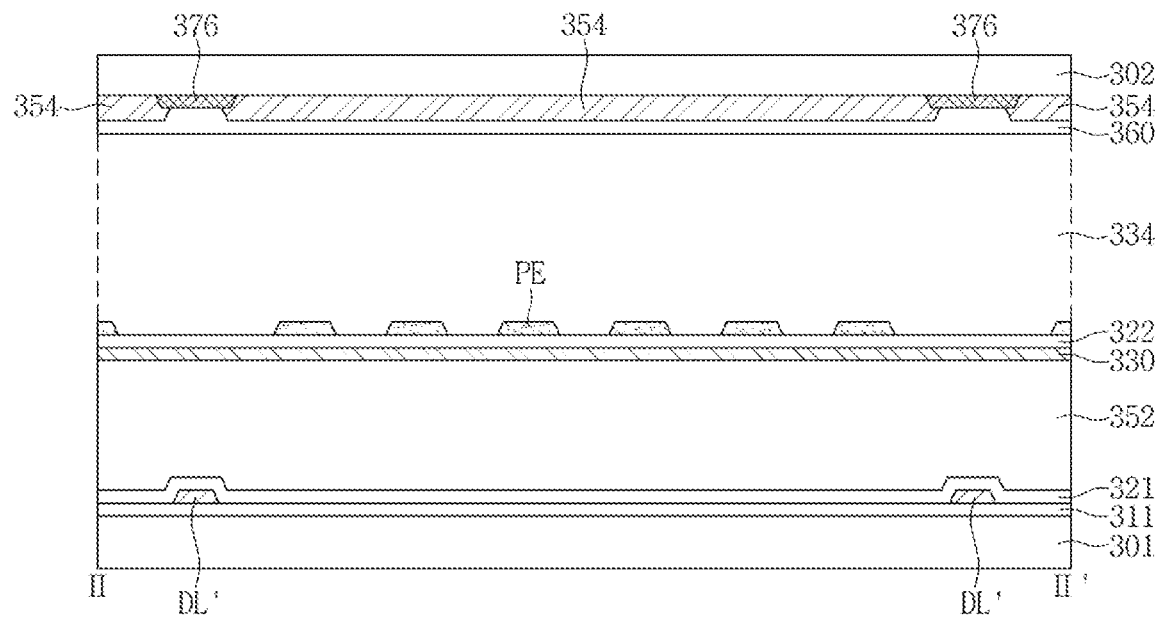
FIG. 6 is a sectional view taken along the line II-II' of FIG. 4.
Figure 7:
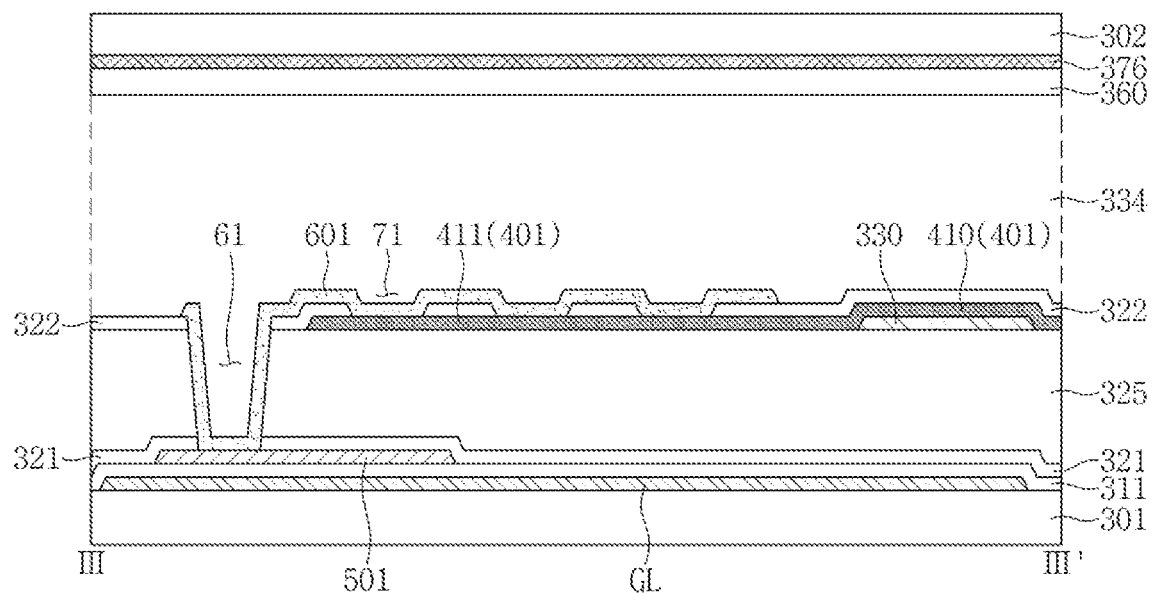
FIG. 7 is a cross-sectional view taken along the line III-III' of FIG. 4.

FIG. 4 is a view enlarging one of pixels illustrated in FIG. 3 and a periphery portion thereof, FIG. 5 is a cross-sectional view taken along the line I-I' of FIG. 4, FIG. 6 is a sectional view taken along the line II-II' of FIG. 4, and FIG. 7 is a cross-sectional view taken along the line III-III' of FIG. 4.

As illustrated in FIGS. 4, 5 and 6, the display device includes a first substrate 301, a pixel PX, a gate line GL, a gate insulating layer 311, a data line DL, a first common line 501, a first passivation layer 321, an insulating interlayer 352, a second passivation layer 322, a common electrode 330, a first auxiliary electrode 401, a first connection electrode 601, a second substrate 302, a light blocking layer 376, a color filter 354, an overcoat layer 360, and a liquid crystal layer 334.

The pixel PX may include a pixel electrode PE and a switching element TFT. The switching element TFT may be a thin film transistor.

The switching element TFT may include a semiconductor layer 344, a gate electrode GE, a source electrode SE, and a drain electrode DE.

The gate line GL and the gate electrode GE may be located on the first substrate 301. The gate electrode GE may have a shape protruding from the gate line GL toward the pixel electrode PE. The gate line GL and the gate electrode GE may be unitary.

At least one of the gate line GL and the gate electrode GE may include or be formed of aluminum (Al) or alloys thereof, silver (Ag) or alloys thereof, copper (Cu) or alloys thereof, and/or molybdenum (Mo) or alloys thereof. In another exemplary embodiment, at least one of the gate line GL and the gate electrode GE may include or be formed of one of chromium (Cr), tantalum (Ta), and titanium (Ti). In an exemplary embodiment, at least one of the gate line GL and the gate electrode GE may have a multilayer structure including at least two conductive layers having different physical properties from each other.

The gate insulating layer 311 may be located on the gate line GL and the gate electrode GE. In such an exemplary embodiment, the gate insulating layer 311 may be located over an entire surface of the first substrate 301 including the gate line GL and the gate electrode GE.

The gate insulating layer 311 may include or be formed of silicon nitride (SiNx) or silicon oxide (SiOx). The gate insulating layer 311 may have a multilayer structure including at least two insulating layers having different physical properties.

The data line DL, the first common line 501, and the semiconductor layer 344 may be located on the gate insulating layer 311. Although not illustrated, an end portion of the data line DL may be connected to another layer or an external driving circuit. The end portion of the data line DL may have a larger planar area than a planar area of another portion of the data line DL.

In order to ensure a maximum transmittance of the display device, as illustrated in FIG. 2, an intermediate portion of the data line DL may be bent, e.g., in a V-like shape. In addition, an intermediate portion of the pixel electrode PE may also be bent, e.g., in a V-like shape.

The data line DL may include or be formed of a refractory metal, such as molybdenum, chromium, tantalum and titanium, or an alloy thereof. The data line DL may have a multilayer structure including a refractory metal layer and a low-resistance conductive layer. Examples of the multilayer structure may include: a double-layer structure including a chromium or molybdenum (alloy) lower layer and an aluminum (alloy) upper layer; and a triple-layer structure including a molybdenum (alloy) lower layer, an aluminum (alloy) intermediate layer, and a molybdenum (alloy) upper layer. In an alternative exemplary embodiment, the data line DL may include or be formed of any suitable metals or conductors rather than the aforementioned materials.

The first common line 501 may overlap the gate line GL. The first common line 501 may include a substantially same material and may have a substantially same structure as those of the aforementioned data line DL. The first common line 501 and the data line DL may be formed substantially simultaneously in a substantially same process.

Although not illustrated, the second common line 502, the third common line 503, the fourth common line 504, the fifth common line 505, and the sixth common line 506 may also be located on the gate insulating layer 311. The first, second, third, fourth, fifth, and sixth common lines 501, 502, 503, 504, 505, and 506 may not be directly connected to each other.

The semiconductor layer 344 may overlap the gate electrode GE, the source electrode SE, and the drain electrode DE. The semiconductor layer 344 may include amorphous silicon, polycrystalline silicon, or the like.

The source electrode SE may be located on the semiconductor layer 344 and the gate insulating layer 311. The source electrode SE may overlap the semiconductor layer 344 and the gate electrode GE. The source electrode SE may have a shape protruding from the data line DL. The source electrode SE and the data line DL may be unitary. The source electrode SE may be a portion of the data line DL.

The source electrode SE may include a substantially same material and may have a substantially same structure (e.g., a multilayer structure) as those of the aforementioned data line DL. The source electrode SE and the data line DL may be formed substantially simultaneously in a substantially same process.

The drain electrode DE, spaced apart from the source electrode SE at a predetermined distance, may be located on the semiconductor layer 344 and the gate insulating layer 311. The drain electrode DE may overlap the semiconductor layer 344 and the gate electrode GE. A channel area of the switching element TFT may be located between the drain electrode DE and the source electrode SE. The drain electrode DE may include a substantially same material and have a substantially same structure (e.g., a multilayer structure) as those of the source electrode SE. The drain electrode DE and the source electrode SE may be formed substantially simultaneously in a substantially same process.

The switching element TFT may further include a first ohmic contact layer 320a and a second ohmic contact layer 320b.

The first ohmic contact layer 320a may be located between the semiconductor layer 344 and the source electrode SE. The first ohmic contact layer 320a may reduce an interfacial resistance between the semiconductor layer 344 and the source electrode SE.

The first ohmic contact layer 320a may include silicide or n+ hydrogenated amorphous silicon doped with n-type impurity ions, e.g., phosphorus (P) or phosphine ($PH_3$), at high concentration.

The second ohmic contact layer 320b may be located between the semiconductor layer 344 and the drain electrode DE. The second ohmic contact layer 320b may reduce an interfacial resistance between the semiconductor layer 344 and the drain electrode DE. The second ohmic contact layer 320b may include a substantially same material and have a substantially same structure (e.g., a multilayer structure) as those of the aforementioned first ohmic contact layer 320a. The first ohmic contact layer 320a and the second ohmic contact layer 320b may be formed substantially simultaneously in a substantially same process.

Although not illustrated, the semiconductor layer 344 may further be disposed between the gate insulating layer 311 and the source electrode SE. In addition, the semiconductor layer 344 may further be disposed between the gate insulating layer 311 and the drain electrode DE. Herein, the semiconductor layer between the gate insulating layer 311 and the source electrode SE may be defined as a first additional semiconductor layer and the semiconductor layer between the gate insulating layer 311, and the drain electrode DE may be defined as a second additional semiconductor layer. In such an exemplary embodiment, the aforementioned first ohmic contact layer 320a may further be disposed between the first additional semiconductor layer and the source electrode SE and the aforementioned second ohmic contact layer 320b may further be disposed between the second additional semiconductor layer and the drain electrode DE.

In addition, although not illustrated, the semiconductor layer 344 may further be disposed between the gate insulating layer 311 and the data line DL. In such an exemplary embodiment, the semiconductor layer between the gate insulating layer 311, and the data line DL may be defined as a third additional semiconductor layer. In such an exemplary embodiment, the aforementioned first ohmic contact layer 320a may further be disposed between the third additional semiconductor layer and the data line DL.

In addition, although not illustrated, the semiconductor layer may further be disposed between the gate insulating layer 311 and the first common line 501. In such an exemplary embodiment, the semiconductor layer between the gate insulating layer 311, and the first common line 501 may be defined as a fourth additional semiconductor layer. In such an exemplary embodiment, an ohmic contact layer may further be disposed between the fourth additional semiconductor layer and the first common line 501.

The first passivation layer 321 is located on the data line DL, the source electrode SE, the drain electrode DE, and the first common line 501. In such an exemplary embodiment, the first passivation layer 321 may be located over an entire surface of the first substrate 301 including the data line DL, the source electrode SE, the drain electrode DE, and the first common line 501. The first passivation layer 321 may have a hole corresponding to a drain contact hole 183 and a hole corresponding to a first common contact hole 61. In addition, although not illustrated, the first passivation layer 321 may have holes corresponding to a second common contact hole 62, a third common contact hole 63, a fourth common contact hole 64, a fifth common contact hole 65, and a sixth common contact hole 66, respectively.

The first passivation layer 321 may include an inorganic insulating material such as silicon nitride ($SiN_x$) or silicon oxide ($SiO_x$) and in such an exemplary embodiment, an inorganic insulating material having photosensitivity and having a dielectric constant of about 4.0 may be used. In an exemplary embodiment, the first passivation layer 321 may have a double-layer structure including a lower inorganic layer and an upper organic layer. The first passivation layer 321 may have a thickness greater than or substantially equal to about 5000 Å, e.g., in a range from about 6000 Å to about 8000 Å.

The insulating interlayer 352 may be located on the first passivation layer 321. The insulating interlayer 352 may have a hole corresponding to the drain contact hole 183 and a hole corresponding to the first common contact hole 61. In addition, although not illustrated, the insulating interlayer 352 may have holes corresponding to the second common contact hole 62, the third common contact hole 63, the fourth common contact hole 64, the fifth common contact hole 65 and the sixth common contact hole 66, respectively.

The insulating interlayer 352 may include an organic material having a relatively low dielectric constant. For example, the insulating interlayer 352 may include a photosensitive organic material having a dielectric constant lower than that of the first passivation layer 321.

The common electrode 330 may be located between the first substrate 301 and the second substrate 302. For example, the common electrode 330 may be located on the insulating interlayer 352. The common electrode 330 may have a hole 138 defined corresponding to the drain contact hole 183.

The common electrode 330 may include a transparent metal layer including, for example, indium zinc oxide (IZO) or indium tin oxide (ITO).

The first auxiliary electrode 401 may be located on the common electrode 330. For example, the first auxiliary electrode 401 may be located at the first area A1 of the common electrode 330. The first auxiliary electrode 401 may be located directly on the common electrode 330. The first auxiliary electrode 401 may be connected to the common electrode 330. The first auxiliary electrode 401 may directly contact the common electrode 330. In addition, the first auxiliary electrode 401 may overlap the gate line GL, the data line DL, the switching element TFT, and the pixel electrode PE. In an exemplary embodiment, the first auxiliary electrode 401 may not overlap the data line DL. For example, a portion of the first auxiliary electrode 401 located on the data line DL may be omitted.

The portion of the first auxiliary electrode 401 located on the data line DL may have a width substantially equal to or wider than a width of the data line DL. In such an exemplary embodiment, the first auxiliary electrode 401 may serve to substantially prevent light leakage between two pixels which are adjacent to each other with respect to the data line DL. Accordingly, the light blocking layer 376 between the two pixels adjacent to each other with respect to the data line DL may be omitted.

The first auxiliary electrode 401 may include a metal that is opaque and highly conductive, which is dissimilar to the common electrode 330. For example, the first auxiliary electrode 401 may include a material substantially the same as a material included in the gate line GL or a material included in the data line DL. In addition, the auxiliary electrode may include an organic material having high electrical conductivity.

Although not illustrated, the second auxiliary electrode 402 and the third auxiliary electrode 403 may also be located on the common electrode 330. The first, second, and third auxiliary electrodes 401, 402, and 403 may not be directly connected to each other. In such an exemplary embodiment, the second auxiliary electrode 402 may directly contact the common electrode 330 at the second area A2 of the common electrode 330 and the third auxiliary electrode 403 may directly contact the common electrode 330 at the third area A3 of the common electrode 330.

The second passivation layer 322 may be located on the first auxiliary electrode 401, the common electrode 330, and the insulating interlayer 352. The second passivation layer 322 may have a hole corresponding to the drain contact hole 183, a hole corresponding to the first common contact hole 61, and a hole corresponding to the first auxiliary contact hole 71. In addition, although not illustrated, the second passivation layer 322 may have a hole corresponding to the second common contact hole 62, a hole corresponding to the third common contact hole 63, a hole corresponding to the fourth common contact hole 64, a hole corresponding to the fifth common contact holes 65, a hole corresponding to the sixth common contact holes 66, a hole corresponding to the second auxiliary contact hole 72, a hole corresponding to the third auxiliary contact holes 73, a hole corresponding to the fourth auxiliary contact hole 74, a hole corresponding to the fifth auxiliary contact hole 75, and a hole corresponding to the sixth auxiliary contact hole 76.

The second passivation layer 322 may include a material substantially the same as a material included in the first passivation layer 321 described above.

The pixel electrode PE and the first connection electrode 601 may be located on the second passivation layer 322.

The pixel electrode PE may be connected to the drain electrode DE. For example, the pixel electrode PE may be connected to the drain electrode DE through the drain contact hole 183 which passes through the first passivation layer 321, the insulating interlayer 352, and the second passivation layer 322.

The pixel electrode PE may include a transparent metal layer including, for example, IZO or ITO described above. In the case where the pixel electrode PE includes IZO, the common electrode 330 may include ITO.

The first connection electrode 601 may be connected to the first common line 501. For example, the first connection electrode 601 may be connected to the first common line 501 through the first common contact hole 61 which passes through the first passivation layer 321, the insulating interlayer 352, and the second passivation layer 322.

The first connection electrode 601 may include a substantially same material and have a substantially same structure as those of the above-described pixel electrode. The first connection electrode 601 and the pixel electrode may be formed substantially simultaneously in a substantially same process.

Although not illustrated, the second connection electrode 602, the third connection electrode 603, the fourth connection electrode 604, the fifth connection electrode 605, and the sixth connection electrode 606 may also be located on the second passivation layer 322. The first, second, third, fourth, fifth, and sixth connection electrodes 601, 602, 603, 604, 605, and 606 are not directly connected to each other. In such an exemplary embodiment, the second connection electrode 602 may be connected to the second common line 502 through the second common contact hole 62 passing through the first passivation layer 321, the insulating interlayer 352, and the second passivation layer 322. The third connection electrode 603 may be connected to the third common line 503 through the third common contact hole 63 passing through the first passivation layer 321, the insulating interlayer 352, and the second passivation layer 322. The fourth connection electrode 604 may be connected to the fourth common line 504 through the fourth common contact hole 64 passing through the first passivation layer 321, the insulating interlayer 352, and the second passivation layer 322. The fifth connection electrode 605 may be connected to the fifth common line 505 through the fifth common contact hole 65 passing through the first passivation layer 321, the insulating interlayer 352, and the second passivation layer 322. In addition, the sixth connection electrode 606 may be connected to the sixth common line 506 through the sixth common contact hole 66 passing through the first passivation layer 321, the insulating interlayer 352, and the second passivation layer 322.

The light blocking layer 376 may be located on the second substrate 302. The light blocking layer 376 may be located corresponding to the gate line GL, the data line DL and the switching element TFT. The light blocking layer 376 may have an opening which defines a pixel area.

The color filter 354 may be located on the second substrate 302. In such an exemplary embodiment, the color filter 354 may be located at a portion of the opening of the light blocking layer 376 corresponding to the pixel area. In addition, an edge of the color filter 354 may be located on the light blocking layer 376.

The overcoat layer 360 may be located on the light blocking layer 376 and the color filter 354. The overcoat layer 360 may be disposed over an entire surface of the second substrate 302 including the light blocking layer 376. The overcoat layer 360 may serve to significantly reduce (e.g., minimize) a height difference among components between the overcoat layer 360 and the second substrate 302, that is, components of the second substrate 302, such as the light blocking layer 376 and the color filter 354. The overcoat layer 360 may not be included in the display device.

The liquid crystal layer 334 may be located between the first substrate 301 and the second substrate 302. The liquid crystal layer 334 may include liquid crystal molecules having negative dielectric anisotropy and aligned vertically. Alternatively, the liquid crystal layer 334 may include a photopolymerizable material which may be a reactive monomer or a reactive mesogen.

Figure 8:
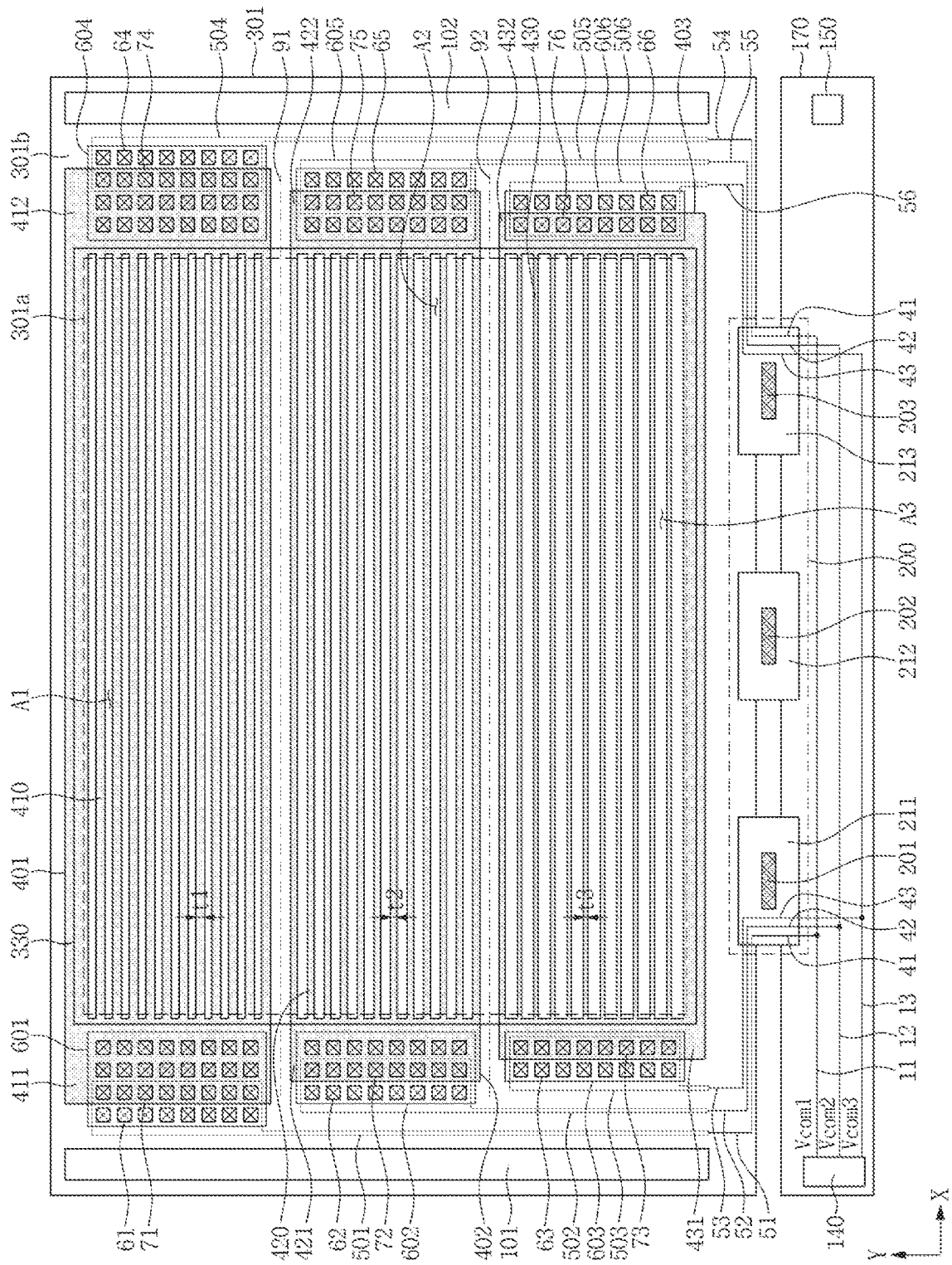
FIG. 8 is a view illustrating a display device according to an alternative exemplary embodiment.

FIG. 8 is a view illustrating a display device according to an alternative exemplary embodiment.

The display device illustrated in FIG. 8 includes a first auxiliary electrode 401, a second auxiliary electrode 402 and a third auxiliary electrode 403, which are separated from each other, as described above.

The first auxiliary electrode 401 may include first auxiliary lines 410 located at a first area A1, the second auxiliary electrode 402 may include second auxiliary lines 420 located at a second area A2, and the third auxiliary electrode 403 may include third auxiliary lines 430 located at a third area A3.

The first area A1, the second area A2, and the third area A3 may have a substantially equal size. Alternatively, at least two of the first, second and third areas A1, A2, and A3 may have different sizes. For example, the first area A1 may have a planar area larger than a planar area of the second area A2 and the second area A2 may have a planar area larger than a planar area of the third area A3.

The first auxiliary lines 410 may have a substantially equal length and a substantially equal width as each other.

The second auxiliary lines 420 may have a substantially equal length and a substantially equal width as each other.

The third auxiliary lines 430 may have a substantially equal length and a substantially equal width as each other.

The first auxiliary line 410, the second auxiliary line 420, and the third auxiliary line 430 may have a substantially equal length as each other.

As illustrated in FIG. 8, different types of the first, second, and third auxiliary electrodes 401, 402, and 403 may have different widths (e.g., a line width), respectively. For example, a width t1 of the first auxiliary electrode 401 may be greater than a width t2 of the second auxiliary electrode 402. In addition, the width t2 of the second auxiliary electrode 402 may be greater than a width t3 of the third auxiliary electrode 403. In other words, the first, second, and third auxiliary electrodes 401, 402, and 403 may increase in width as the distance from the data driver 200 increases. In such an exemplary embodiment, if the sizes of the respective areas A1, A2, and A3 are substantially equal to each other, and the lengths of the respective auxiliary lines 410, 420, and 430 are substantially equal to each other, a voltage drop of a common voltage applied to the third auxiliary electrodes 403 located relatively far from the data driver 200 may be substantially minimized. Accordingly, a deviation between respective common voltages Vcom1, Vcom2, and Vcom3 may be substantially minimized.

Although not illustrated, the first auxiliary lines 410, the second auxiliary lines 420, and the third auxiliary lines 430 of FIG. 8 may overlap gate lines GL, as described above. In other words, the first auxiliary lines 410 may overlap gate lines GL of the first area A1, the second auxiliary lines 420 may overlap gate lines GL of the second area A2, and the third auxiliary lines 430 may overlap gate lines GL of the third area A3. Detailed descriptions thereof will make reference to the above descriptions described with reference to FIGS. 1, 2, 3, 4, 5, 6, and 7.

In addition, a first substrate 301, a first gate driver 101, a second gate driver 102, a data driver 200, a PCB 170, a timing controller 150, a power supply unit 140, a common electrode 330, a plurality of gate lines GL, a plurality of data lines DL, a first common line 501, a second common line 502, a third common line 503, a fourth common line 504, a fifth common line 505, a sixth common line 506, a first connection electrode 601, a second connection electrode 602, a third connection electrode 603, a fourth connection electrode 604, a fifth connection electrode 605, and a sixth connection electrode 606 of FIG. 8 are substantially equal to those of FIGS. 1, 2, 3, 4, 5, 6, and 7, and accordingly, the detailed descriptions thereof will make reference to the above descriptions described with reference to FIGS. 1, 2, 3, 4, 5, 6, and 7.

Figure 9:
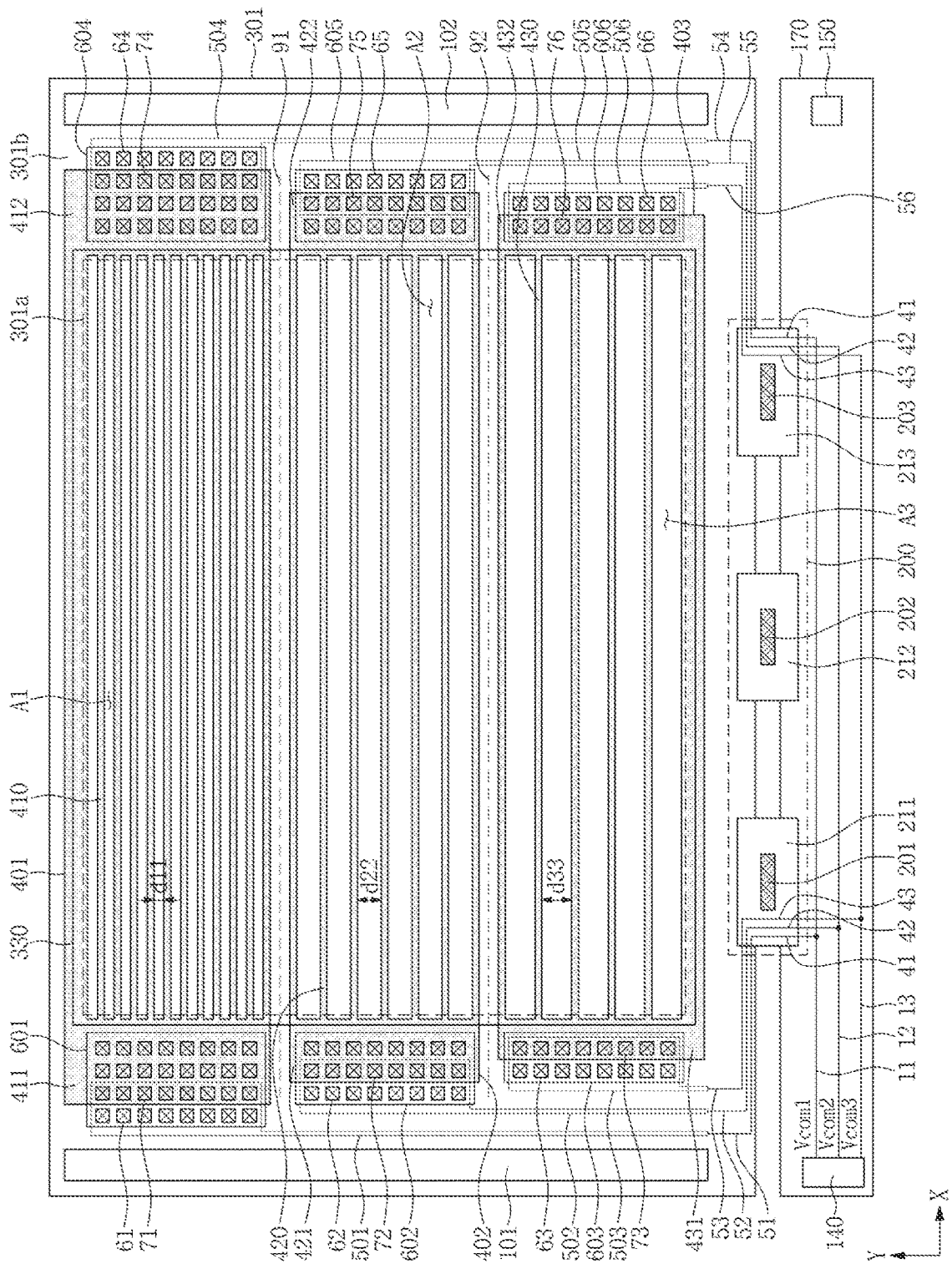
FIG. 9 is a view illustrating a display device according to another alternative exemplary embodiment.

FIG. 9 is a view illustrating a display device according to another alternative exemplary embodiment.

The display device illustrated in FIG. 9 includes a first auxiliary electrode 401, a second auxiliary electrode 402, and a third auxiliary electrode 403 which are separated from each other, as described above.

The first auxiliary electrode 401 may include first auxiliary lines 410 located at a first area A1, the second auxiliary electrode 402 may include second auxiliary lines 420 located at a second area A2, and the third auxiliary electrode 403 may include third auxiliary lines 430 located at a third area A3.

The first area A1, the second area A2, and the third area A3 may have a substantially equal size. Alternatively, at least two of the first, second, and third areas A1, A2, and A3 may have different sizes. For example, the first area A1 may have a planar area larger than a planar area of the second area A2 and the second area A2 may have a planar area larger than a planar area of the third area A3.

The first auxiliary lines 410 may have a substantially equal length and a substantially equal width as each other.

The second auxiliary lines 420 may have a substantially equal length and a substantially equal width as each other.

The third auxiliary lines 430 may have a substantially equal length and a substantially equal width as each other.

The first auxiliary line 410, the second auxiliary line 420, and the third auxiliary line 430 may have a substantially equal length as each other.

The first auxiliary line 410, the second auxiliary line 420, and the third auxiliary line 430 may have a substantially equal width as each other.

As illustrated in FIG. 9, the first, second and third auxiliary lines 410, 420, and 430 have different distances. For example, a distance d11 between adjacent ones of the first auxiliary lines 410 may be less than a distance d22 between adjacent ones of the second auxiliary lines 420. In addition, the distance d22 between adjacent ones of the second auxiliary lines 420 may be less than a distance d33 between adjacent ones of the third auxiliary lines 430. In other words, the distance between the first, second, and third auxiliary electrodes 401, 402, and 403 may decrease as the distance from the data driver 200 increases. In other words, the first, second, and third auxiliary electrodes 401, 402, and 403 include auxiliary lines having a decreasing distance between each other, as a distance from the data driver 200 increases. In such an exemplary embodiment, if the sizes of the respective areas A1, A2, and A3 may be substantially equal to each other, and the lengths and the widths of the respective auxiliary lines 410, 420, and 430 may be substantially equal to each other, there may be a different number of auxiliary lines at each area. For example, a relatively greater number of auxiliary lines may be located at the first area A1. In such an exemplary embodiment, a voltage drop of a common voltage applied to the third auxiliary electrodes 403 which is located relatively far from the data driver 200 may be substantially minimized. Accordingly, a deviation between respective common voltages Vcom1, Vcom2, and Vcom3 may be substantially minimized.

In addition, as illustrated in FIG. 9, the first, second, and third auxiliary electrodes 401, 402, and 403 may include different numbers of auxiliary lines. In other words, the respective numbers of first, second, and third auxiliary lines 410, 420, and 430 may be different from each other. For example, the number of first auxiliary lines 410 located farthest from the data driver 200 may be the greatest and the number of third auxiliary lines 430 located closest to the data driver 200 may be the smallest. In addition, the number of second auxiliary lines 420 which are located closer to the data driver 200 than the third auxiliary lines 430 and farther from the data driver 200 than the first auxiliary lines 410 may be greater than the number of third auxiliary lines 430 and less than the number of first auxiliary lines 410. As such, the auxiliary electrodes may include a greater number of auxiliary lines, as the distance from the data driver 200 increases.

Although not illustrated, the first auxiliary lines 410, the second auxiliary lines 420, and the third auxiliary lines 430 of FIG. 9 may overlap gate lines GL, as described above. In other words, the first auxiliary lines 410 overlap gate lines GL of the first area A1, the second auxiliary lines 420 overlap gate lines GL of the second area A2, and the third auxiliary lines 430 overlap gate lines GL of the third area A3. Detailed descriptions thereof will make reference to the above descriptions described with reference to FIGS. 1, 2, 3, 4, 5, 6, and 7.

In addition, a first substrate 301, a first gate driver 101, a second gate driver 102, a data driver 200, a PCB 170, a timing controller 150, a power supply unit 140, a common electrode 330, a plurality of gate lines GL, a plurality of data lines DL, a first common line 501, a second common line 502, a third common line 503, a fourth common line 504, a fifth common line 505, a sixth common line 506, a first connection electrode 601, a second connection electrode 602, a third connection electrode 603, a fourth connection electrode 604, a fifth connection electrode 605, and a sixth connection electrode 606 of FIG. 9 may be substantially equal to those of FIGS. 1, 2, 3, 4, 5, 6, and 7, and accordingly, the detailed descriptions thereof will make reference to the above descriptions described with reference to FIGS. 1, 2, 3, 4, 5, 6, and 7.

Figure 10:
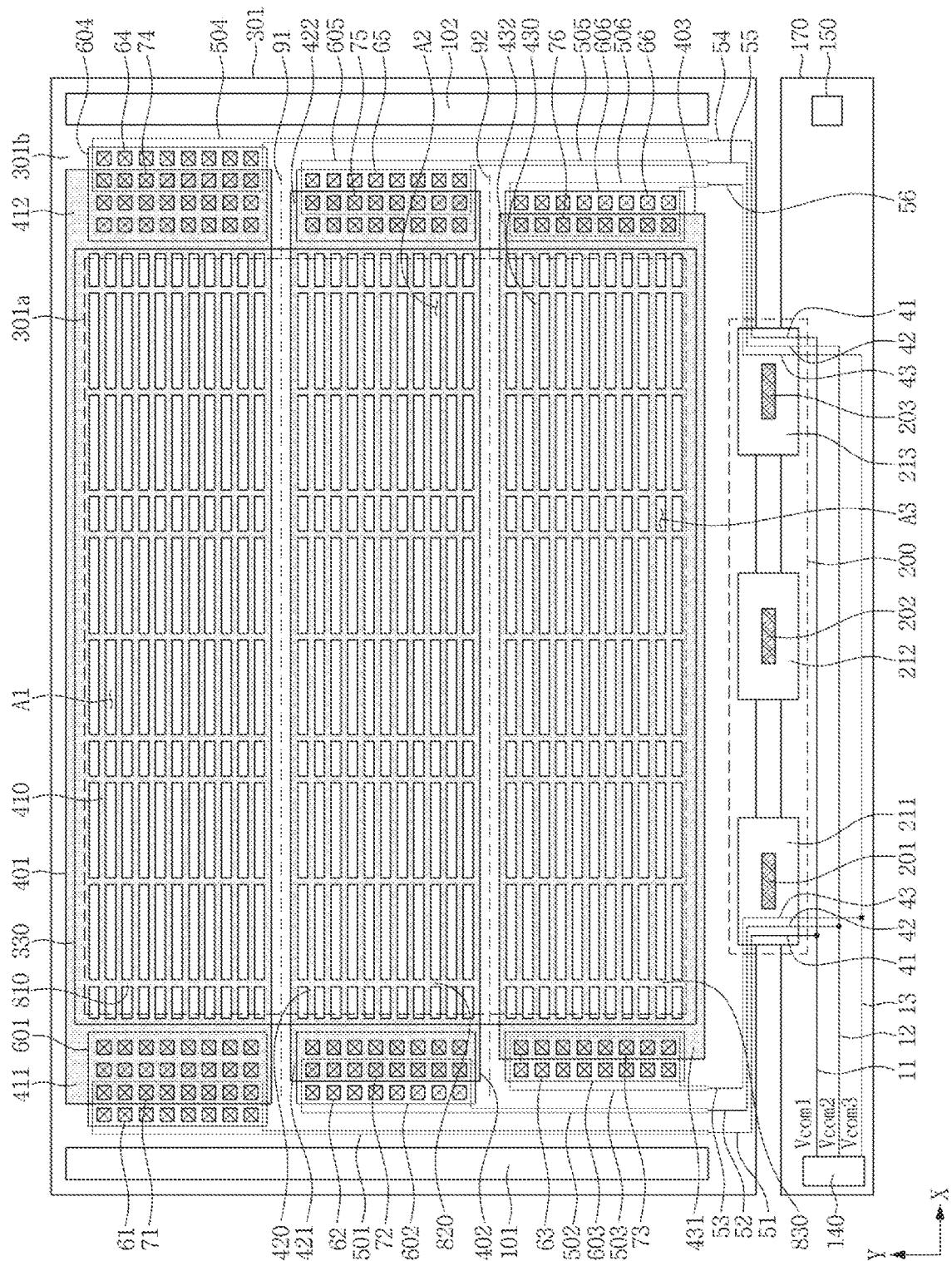
FIG. 10 is a view illustrating a display device according to still another alternative exemplary embodiment.

FIG. 10 is a view illustrating a display device according to still another alternative exemplary embodiment.

The display device illustrated in FIG. 10 includes a first auxiliary electrode 401, a second auxiliary electrode 402, and a third auxiliary electrode 403 which are separated from each other, as described above.

The first auxiliary electrode 401 may include first auxiliary lines 410 located at a first area A1, the second auxiliary electrode 402 may include second auxiliary lines 420 located at a second area A2, and the third auxiliary electrode 403 may include third auxiliary lines 430 located at a third area A3.

The first area A1, the second area A2, and the third area A3 may have a substantially equal size. Alternatively, at least two of the first, second, and third areas A1, A2, and A3 may have different sizes. For example, the first area A1 may have a planar area larger than a planar area of the second area A2 and the second area A2 may have a planar area larger than a planar area of the third area A3.

The first auxiliary lines 410 may have a substantially equal length and a substantially equal width as each other.

The second auxiliary lines 420 may have a substantially equal length and a substantially equal width as each other.

The third auxiliary lines 430 may have a substantially equal length and a substantially equal width as each other.

The first auxiliary line 410, the second auxiliary line 420, and the third auxiliary line 430 may have a substantially equal length as each other.

The first auxiliary line 410, the second auxiliary line 420, and the third auxiliary line 430 may have a substantially equal width as each other.

As illustrated in FIG. 10, the first auxiliary electrode 401 further includes at least one connection line (hereinafter, "a first connection line 810"), the second auxiliary electrode 402 further includes at least one connection line (hereinafter, "a second connection line 820"), and the third auxiliary electrode 403 further includes at least one connection line (hereinafter, "a third connection line 830").

The first connection line 810 may connect adjacent ones of the first auxiliary lines 410 to each other. The first connection line 810 may be located at the first area A1. The first connection line 810 may crosses the first auxiliary line 410. The first connection line 810 may directly contact a common electrode 330. The first connection line 810 may overlap a data line DL. The first connection line 810 may be located along the data line DL at the first area A1. The first connection line 810 and the first auxiliary line 410 may be unitary.

The second connection line 820 may connect adjacent ones of the second auxiliary lines 420 to each other. The second connection line 820 may be located at the second area A2. The second connection line 820 may cross the second auxiliary line 420. The second connection line 820 may directly contact the common electrode 330. The second connection line 820 may overlap the data line DL. The second connection line 820 may be located along the data line DL at the second area A2. The second connection line 820 and the second auxiliary line 420 may be unitary.

The third connection line 830 may connect adjacent ones of the third auxiliary lines 430 to each other. The third connection line 830 may be located at the third area A3. The third connection line 830 may cross the third auxiliary line 430. The third connection line 830 may directly contact the common electrode 330. The third connection line 830 may overlap the data line DL. The third connection line 830 may be located along the data line DL at the third area A3. The third connection line 830 and the third auxiliary line 430 may be unitary.

Although not illustrated, the first auxiliary lines 410, the second auxiliary lines 420, and the third auxiliary lines 430 of FIG. 10 overlap gate lines GL, as described above. In other words, the first auxiliary lines 410 may overlap gate lines GL of the first area A1, the second auxiliary lines 420 may overlap gate lines GL of the second area A2, and the third auxiliary lines 430 may overlap gate lines GL of the third area A3. Detailed descriptions thereof will make reference to the above descriptions described with reference to FIGS. 1, 2, 3, 4, 5, 6, and 7.

Additionally, a first substrate 301, a first gate driver 101, a second gate driver 102, a data driver 200, a PCB 170, a timing controller 150, a power supply unit 140, a common electrode 330, a plurality of gate lines GL, a plurality of data lines DL, a first common line 501, a second common line 502, a third common line 503, a fourth common line 504, a fifth common line 505, a sixth common line 506, a first connection electrode 601, a second connection electrode 602, a third connection electrode 603, a fourth connection electrode 604, a fifth connection electrode 605, and a sixth connection electrode 606 of FIG. 10 may be substantially equal to those of FIGS. 1, 2, 3, 4, 5, 6, and 7, and accordingly, the detailed descriptions thereof will make reference to the above descriptions described with reference to FIGS. 1, 2, 3, 4, 5, 6, and 7.

Figure 11:
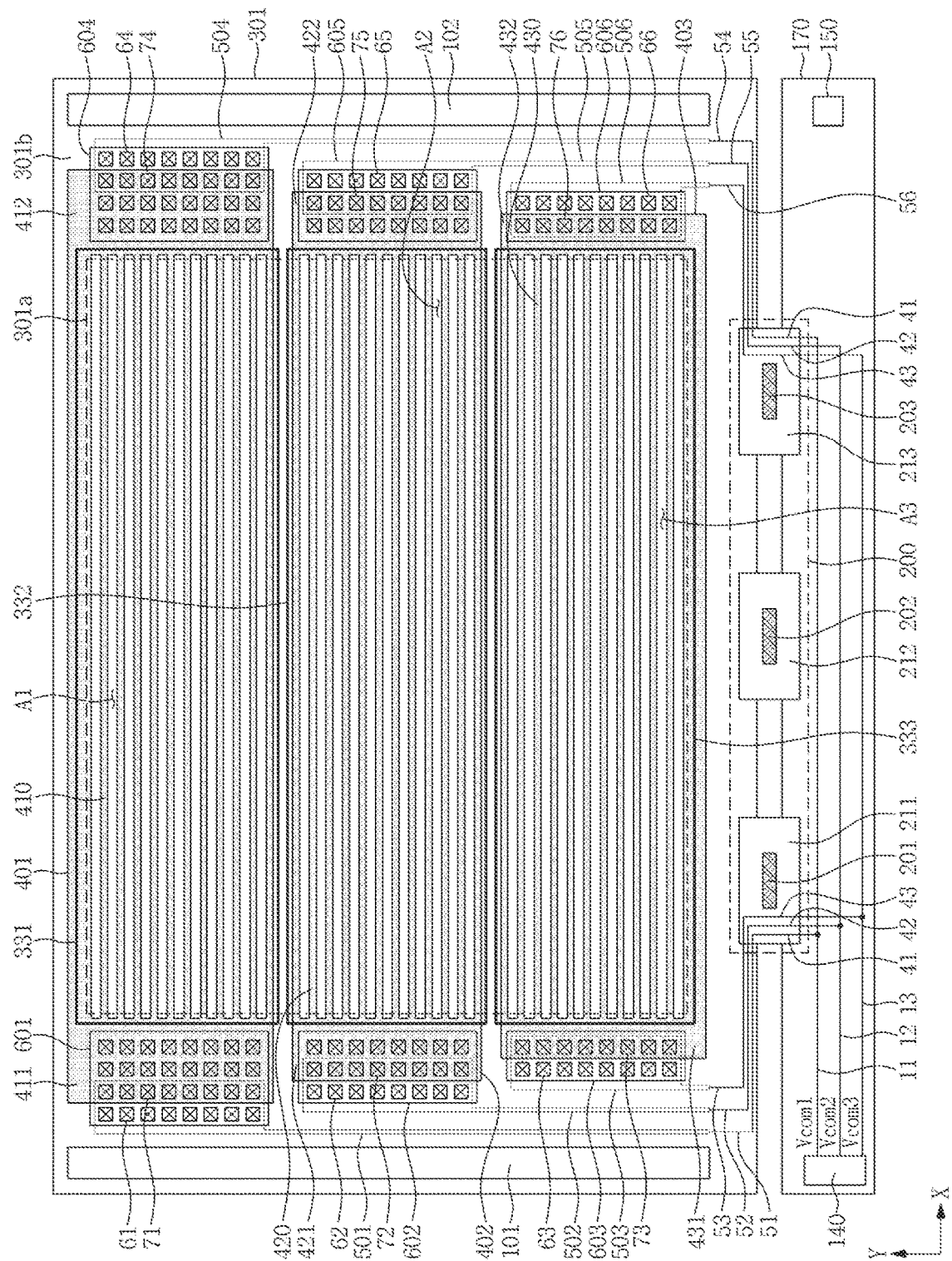
FIG. 11 is a view illustrating a display device according to yet another alternative exemplary embodiment.

FIG. 11 is a view illustrating a display device according to yet another alternative exemplary embodiment.

The display device illustrated in FIG. 11 may include a first auxiliary electrode 401, a second auxiliary electrode 402, and a third auxiliary electrode 403 which are separated from each other, as described above.

The first auxiliary electrode 401 may include first auxiliary lines 410, the second auxiliary electrode 402 includes second auxiliary lines 420, and the third auxiliary electrode 403 includes third auxiliary lines 430.

The first auxiliary lines 410 may have a substantially equal length and a substantially equal width as each other.

The second auxiliary lines 420 may have a substantially equal length and a substantially equal width as each other.

The third auxiliary lines 430 may have a substantially equal length and a substantially equal width as each other.

The first auxiliary line 410, the second auxiliary line 420 and the third auxiliary line 430 may have a substantially equal length as each other.

The first auxiliary line 410, the second auxiliary line 420 and the third auxiliary line 430 may have a substantially equal width as each other.

As illustrated in FIG. 11, the display device includes a first common electrode 331, a second common electrode 332, and a third common electrode 333 which are separated from each other. That is, the display device of FIG. 11 includes a plurality of common electrodes 330 separated from each other rather than a single common electrode 330.

The first common electrode 331, the second common electrode 332, and the third common electrode 333 may have a substantially equal size. Alternatively, at least two of the first, second, and third common electrodes 331, 332, and 333 may have different sizes from each other. For example, the first common electrode 331 may have a planar area larger than a planar area of the second common electrode 332 and the second common electrode 332 may have a planar area larger than a planar area of the third common electrode 333.

The first auxiliary electrode 401 may overlap the first common electrode 331. The first auxiliary electrode 401 may directly contact the first common electrode 331. For example, the first auxiliary lines 410 of the first auxiliary electrode 401 may directly contact the first common electrode 331.

The second auxiliary electrode 402 may overlap the second common electrode 332. The second auxiliary electrode 402 may directly contact the second common electrode 332. For example, the second auxiliary lines 420 of the second auxiliary electrode 402 may directly contact the second common electrode 332.

The third auxiliary electrode 403 may overlap the third common electrode 332. The third auxiliary electrode 403 may directly contact the third common electrode 332. For example, the third auxiliary lines 430 of the third auxiliary electrode 403 directly may contact the third common electrode 333.

A distance between adjacent ones of the common electrodes 330 may be different from a distance between auxiliary lines each connected to one of the adjacent common electrodes 330. For example, a distance between the first common electrode 331 and the second common electrode 332 may be greater than a distance between adjacent ones of the first auxiliary lines 410.

The number of common electrodes illustrated in FIG. 11 may be substantially equal to the number of auxiliary electrodes described above. For example, if the number of auxiliary electrodes is n, the number of common electrodes is n.

Although not illustrated, the first auxiliary lines 410, the second auxiliary lines 420, and the third auxiliary lines 430 of FIG. 11 may overlap gate lines GL, as described above. In other words, the first auxiliary lines 410 may overlap gate lines GL of a first area A1, the second auxiliary lines 420 may overlap gate lines GL of a second area A2, and the third auxiliary lines 430 may overlap gate lines GL of a third area A3. Detailed descriptions thereof will make reference to the above descriptions described with reference to FIGS. 1, 2, 3, 4, 5, 6, and 7.

In addition, a first substrate 301, a first gate driver 101, a second gate driver 102, a data driver 200, a PCB 170, a timing controller 150, a power supply unit 140, a common electrode 330, a plurality of gate lines GL, a plurality of data lines DL, a first common line 501, a second common line 502, a third common line 503, a fourth common line 504, a fifth common line 505, a sixth common line 506, a first connection electrode 601, a second connection electrode 602, a third connection electrode 603, a fourth connection electrode 604, a fifth connection electrode 605, and a sixth connection electrode 606 of FIG. 11 may be substantially equal to those of FIGS. 1, 2, 3, 4, 5, 6, and 7, and accordingly, the detailed descriptions thereof will make reference to the above descriptions described with reference to FIGS. 1, 2, 3, 4, 5, 6, and 7.

As set forth hereinabove, the LCD device according to one or more exemplary embodiments may provide the following effects.

Auxiliary electrodes may be separated from each other and connected to different portions of a common electrode. The auxiliary electrodes may provide a common voltage to the common electrode from common lines separated from each other. In such a manner, the common voltage may be independently applied to each area of the common electrode. Accordingly, a common voltage having an optimum level may be independently applied to each area of the common electrode. As a result, a deviation of a kickback voltage in a display area corresponding to each area of the common electrode may be substantially minimized and the image quality may be improved.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A display device comprising:
a first substrate and a second substrate facing each other;
a common electrode between the first substrate and the second substrate, the common electrode comprising a first area and a second area, the second area being unitary with the first area;
a first pixel group comprising a plurality of first pixel electrodes located at a display area of the first substrate and overlapping the first area of the common electrode;
a second pixel group comprising a plurality of second pixel electrodes located at the display area of the first substrate and overlapping the second area of the common electrode;
a first auxiliary line physically connected to the first area of the common electrode;
a second auxiliary line physically connected to the second area of the common electrode;
a first connection portion located at a non-display area of the first substrate and electrically connected to the first auxiliary line;
a second connection portion located at the non-display area of the first substrate and electrically connected to the second auxiliary line;
a first common line connected to the first connection portion;
a second common line connected to the second connection portion;
a first connection electrode connecting the first connection portion and the first common line to each other, the first connection electrode being disposed on a first layer different from layers of the first connection portion and the first common line; and
a second connection electrode connecting the second connection portion and the second common line to each other, the second connection electrode being disposed on a second layer different from layers of the second connection portion and the second common line,
wherein the first connection portion and the second connection portion do not physically contact each other,
wherein the first connection electrode has a first overlap portion which overlaps the first connection portion and the second connection electrode has a second overlap portion which overlaps the second connection portion,
wherein the first and the second common lines face a same side of the common electrode,
wherein a first end portion of the first common line is connected to a first end portion of the second common line by the common electrode, and
wherein a second end portion of the first common line is not in contact with a second end portion of the second common line.

2. The display device as claimed in claim 1, further comprising:
at least one data line located at the first substrate; and
a data driver driving said at least one data line,
wherein the first connection electrode is located farther away from the data driver than the second connection electrode is from the data driver, and
a size of the first connection electrode is larger than a size of the second connection electrode.

3. The display device as claimed in claim 1, further comprising:
at least one data line located at the first substrate; and
a data driver driving said at least one data line, wherein the first overlap portion is located farther away from the data driver than the second overlap portion, and a size of the first overlap portion is larger than a size of the second overlap portion.

4. The display device as claimed in claim 1, further comprising a power supply unit applying a first common voltage to the first common line and applying a second common voltage to the second common line.

5. The display device as claimed in claim 4, wherein the second common voltage is substantially equal to or higher than the first common voltage.

6. The display device as claimed in claim 1, wherein at least one of the first connection electrode and the second connection electrode comprises a material substantially the same as a material comprised in each pixel electrode.

7. The display device as claimed in claim 1, further comprising at least one gate line located at the first substrate, wherein the first auxiliary line overlaps a gate line located at the first area.

8. The display device as claimed in claim 1, further comprising at least one gate line located at the first substrate, wherein the second auxiliary line overlaps a gate line located at the second area.

9. The display device as claimed in claim 1, wherein the first auxiliary line comprises a plurality of first auxiliary lines and the second auxiliary line comprises a plurality of second auxiliary lines, and a distance between a first auxiliary line and a second auxiliary line that are adjacent to each other is greater than a distance between adjacent ones of the first auxiliary lines.

10. The display device as claimed in claim 1, wherein the first auxiliary line comprises a plurality of first auxiliary lines and the second auxiliary line comprises a plurality of second auxiliary lines, and a distance between adjacent ones of the first auxiliary lines is substantially equal to a distance between adjacent ones of the second auxiliary lines.

11. The display device as claimed in claim 1, wherein the first auxiliary line comprises a plurality of first auxiliary lines and the second auxiliary line comprises a plurality of second auxiliary lines, and a distance between adjacent ones of the first auxiliary lines is different from a distance between adjacent ones of the second auxiliary lines.

12. The display device as claimed in claim 11, further comprising:

at least one data line located at the first substrate; and
a data driver driving said at least one data line,
wherein the first auxiliary line comprises a plurality of first auxiliary lines and the second auxiliary line comprises a plurality of second auxiliary lines,
the first auxiliary line is located farther away from the data driver than the second auxiliary line is from the data driver, and
a distance between adjacent ones of the first auxiliary lines is less than a distance between adjacent ones of the second auxiliary lines.

13. The display device as claimed in claim 1, wherein the number of first auxiliary lines is different from the number of second auxiliary lines.

14. The display device as claimed in claim 13, further comprising:

at least one data line located at the first substrate; and
a data driver driving said at least one data line,
wherein the first auxiliary line is located farther away from the data driver than the second auxiliary line is from the data driver, and
the number of first auxiliary lines is greater than the number of second auxiliary lines.

15. The display device as claimed in claim 1, wherein a width of the first auxiliary line is different from a width of the second auxiliary line.

16. The display device as claimed in claim 15, further comprising:

at least one data line located at the first substrate; and
a data driver driving said at least one data line,
wherein the first auxiliary line is located farther away from the data driver than the second auxiliary line is from the data driver, and
the width of the first auxiliary line is greater than the width of the second auxiliary line.

17. The display device as claimed in claim 1, further comprising at least one first connection line connecting adjacent ones of the first auxiliary lines.

18. The display device as claimed in claim 17, further comprising at least one data line located at the first substrate, wherein said at least one first connection line overlaps at least one data line located at the first area.

19. The display device as claimed in claim 1, further comprising at least one second connection line connecting adjacent ones of the second auxiliary lines.

20. The display device as claimed in claim 19, further comprising at least one data line located at the first substrate, wherein said at least one second connection line overlaps at least one data line located at the second area.

21. The display device as claimed in claim 1, wherein the common electrode further comprises at least one of third to n-th areas, wherein n is a natural number greater than 3.

22. The display device as claimed in claim 21, further comprising at least one third auxiliary line to at least one n-th auxiliary line connected in one-to-one correspondence to said third to n-th areas.

23. The display device as claimed in claim 22, further comprising third to n-th connection portions electrically connected in one-to-one correspondence to said at least one third auxiliary line to said at least one n-th auxiliary line, wherein the first to n-th connection portions are not physically connected to each other.

24. The display device as claimed in claim 1, wherein the common electrode comprises a first common electrode and a second common electrode which are separated from each other, the first common electrode is located at the first area and the second common electrode is located at the second area,
the first auxiliary line is connected to the first common electrode, and
the second auxiliary line is connected to the second common electrode.

25. The display device as claimed in claim 24, further comprising at least one of third to n-th common electrodes which are separated from each other, wherein n is a natural number greater than 3.

26. The display device as claimed in claim 25, further comprising at least one third auxiliary line to at least one n-th auxiliary line connected in one-to-one correspondence to said third to n-th common electrode.

27. The display device as claimed in claim 1, wherein one side of the first connection electrode is connected to the first common line through a first contact hole and another side of the first connection electrode is connected to the first connection portion through a second contact hole; and wherein one side of the second connection electrode is connected to the second common line through a third contact hole and another side of the second connection electrode is connected to the second connection portion through a fourth contact hole.

\* \* \* \* \*